(12) United States Patent
Seo et al.

(10) Patent No.: US 9,995,972 B2
(45) Date of Patent: Jun. 12, 2018

(54) DISPLAY DEVICE

(71) Applicant: Samsung Display Co., Ltd., Giheung-Gu, Yongin-si (KR)

(72) Inventors: O Sung Seo, Seoul (KR); Hyun-Ho Kang, Ansan-si (KR); Seung Jun Yu, Suwon-si (KR); Ha Won Yu, Suwon-si (KR); Ki Kyung Youk, Bucheon-si (KR); Yeo Geon Yoon, Suwon-si (KR); Sang-Myoung Lee, Seoul (KR); Tae Kyung Yim, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 9 days.

(21) Appl. No.: 14/849,328

(22) Filed: Sep. 9, 2015

(65) Prior Publication Data

US 2016/0109769 A1 Apr. 21, 2016

(30) Foreign Application Priority Data

Oct. 16, 2014 (KR) .......................... 10-2014-0139792

(51) Int. Cl.
*G02F 1/1337* (2006.01)
*G02F 1/1343* (2006.01)

(52) U.S. Cl.
CPC .. *G02F 1/134309* (2013.01); *G02F 1/133753* (2013.01); *G02F 1/133707* (2013.01); *G02F 2001/133742* (2013.01); *G02F 2001/133757* (2013.01); *G02F 2001/134345* (2013.01); *G02F 2001/134354* (2013.01)

(58) Field of Classification Search
CPC ......... G02F 1/134309; G02F 1/133707; G02F 2001/134345
See application file for complete search history.

(56) References Cited

U.S. PATENT DOCUMENTS

2014/0176856 A1* 6/2014 Lee ................... G02F 1/133305
349/61
2015/0055063 A1* 2/2015 Hsieh ................ G02F 1/133753
349/99

FOREIGN PATENT DOCUMENTS

| JP | 2007-256811 | 10/2007 |
|---|---|---|
| KR | 10-2008-0032768 | 4/2008 |
| KR | 10-2013-0125638 | 11/2013 |
| KR | 10-2014-0021105 | 2/2014 |

* cited by examiner

*Primary Examiner* — Kendrick Hsu
(74) *Attorney, Agent, or Firm* — Innovation Counsel, LLP

(57) ABSTRACT

A display device according to an exemplary embodiment of the present inventive concept includes: a first insulation substrate; a thin film transistor; a pixel electrode; a second insulation substrate; and a common electrode. The pixel electrode includes a first subpixel electrode including a first horizontal stem portion and a first vertical stem portion perpendicular thereto at one end of the first horizontal stem portion and a second subpixel electrode including a second vertical stem portion and a second horizontal stem portion perpendicular thereto at one end of the second horizontal stem portion, a plurality of regions in which arrangements of liquid crystal molecules are respectively different are divided by the first horizontal stem portion, the first vertical stem portion, the second horizontal stem portion, and the second vertical stem portion, and each of the plurality of regions has a longest vertical length of less than about 100 μm.

18 Claims, 16 Drawing Sheets

DISPLAY DEVICE

CROSS-REFERENCE TO RELATED APPLICATION

This application claims priority to and the benefit of Korean Patent Application No. 10-2014-0139792 filed in the Korean Intellectual Property Office on Oct. 16, 2014, the entire contents of which are incorporated herein by reference.

BACKGROUND (a) Field

The present inventive concept relates to a display device.

(b) Description of the Related Art

In general, as one of the most widely used displays at present, a liquid crystal display (LCD) include two display panels on which field generating electrodes such as a pixel electrode and a common electrode are respectively formed, and a liquid crystal layer interposed between the two display panels.

The LCD displays an image by generating an electric field on a liquid crystal layer by applying a voltage to the field generating electrodes, determining alignment directions of liquid crystal molecules of the liquid crystal layer through the generated field, and controlling polarization of incident light.

A size of the LCD is becoming larger since it is used as a display of a television receiver. As the size of the LCD becomes larger, a significant visual difference is observed by a viewer depending on whether a center portion or left/right ends of a screen is viewed.

To compensate such a visual difference, the curved display device, which is concavely or convexly curved, is developed.

The display device may be a portrait type of display device with its vertical length longer than its horizontal length and curved in a vertical direction, or a landscape type of display device with its vertical length shorter than its horizontal length and curved in a horizontal direction.

However, as the LCD becomes larger, one pixel area becomes larger, and therefore, when the curved LCD is formed, the horizontal smudge may be recognized, thereby resulting in decreased luminance.

The above information disclosed in this Background section is only for enhancement of understanding of the background of the inventive concept and therefore it may contain information that does not form the prior art.

SUMMARY

The present inventive concept has been made in an effort to eliminate a horizontal smudge that can occur in a display device and thus to provide improved luminance.

An exemplary embodiment of the present inventive concept provides a display device including: a first insulation substrate; a thin film transistor disposed on the first insulation substrate; a pixel electrode coupled to the thin film transistor; a second insulation substrate facing the first insulation substrate; and a common electrode disposed on the second insulation substrate. The pixel electrode includes a first subpixel electrode including a first horizontal stem portion and a first vertical stem portion perpendicular thereto at one end of the first horizontal stem portion and a second subpixel electrode including a second vertical stem portion and a second horizontal stem portion perpendicular thereto at one end of the second horizontal stem portion, a plurality of regions in which arrangements of liquid crystal molecules are respectively different are divided by the first horizontal stem portion, the first vertical stem portion, the second horizontal stem portion, and the second vertical stem portion, and each of the plurality of regions has a longest vertical length of less than about 100 µm.

The display device may be a curved type.

The first subpixel electrode may further include first minute branch portions that extend from the first horizontal stem portion and the first vertical stem portion, and the second subpixel electrode may further include second minute branch portions that extend from the second horizontal stem portion and the second vertical stem portion.

The first subpixel electrode may include a plurality of first vertical stem portions, and the plurality of first vertical stem portions may be alternately disposed.

The first subpixel electrode may include four regions in which the arrangements of the liquid crystal molecules are respectively different along a row direction.

The second subpixel electrode may include a plurality of second vertical stem portions, and the plurality of second vertical stem portions may be alternately disposed.

The second subpixel electrode may include four regions in which the arrangements of the liquid crystal molecules are respectively different along a row direction.

The display device may have pixel electrode that are arranged in a matrix form.

A size of each region included in the first subpixel electrode may be smaller than that of each region included in the second subpixel electrode.

Each region included in the second subpixel electrode may have a vertical length of less than about 100 µm.

The number of second horizontal stem portions may be greater than that of the first horizontal stem portion, and each region included in the first subpixel electrode may have a vertical length of less than about 100 µm.

The first subpixel electrode may include first minute branch portions that extend from the first horizontal stem portion and the first vertical stem portion, and the second subpixel electrode may include second minute branch portions that extend from the second horizontal stem portion and the second vertical stem portion.

The first subpixel electrode may include a plurality of first vertical stem portions, and the plurality of first vertical stem portions may be alternately disposed.

The first subpixel electrode may include four regions in which the arrangements of the liquid crystal molecules are respectively different along a row direction.

The second subpixel electrode may include a plurality of second vertical stem portions, and the plurality of second vertical stem portions may be alternately disposed.

The second subpixel electrode may include four regions in which the arrangements of the liquid crystal molecules are respectively different along a row direction.

The display device may have the pixel electrode that is arranged in a matrix form.

A size of each region included in the first subpixel electrode may be greater than that of each region included in the second subpixel electrode.

Each region included in the second subpixel electrode may have a vertical length of less than about 100 µm.

The number of second horizontal stem portions may be greater than that of the first horizontal stem portion, and each region included in the first subpixel electrode may have a vertical length of less than about 100 µm.

Accordingly, the display device may provide the improved luminance and prevent the horizontal smudge from being recognized despite its larger size.

In addition, the curved display device having the aforementioned characteristics can be provided.

DETAILED DESCRIPTION OF THE EMBODIMENTS

Figure 1:
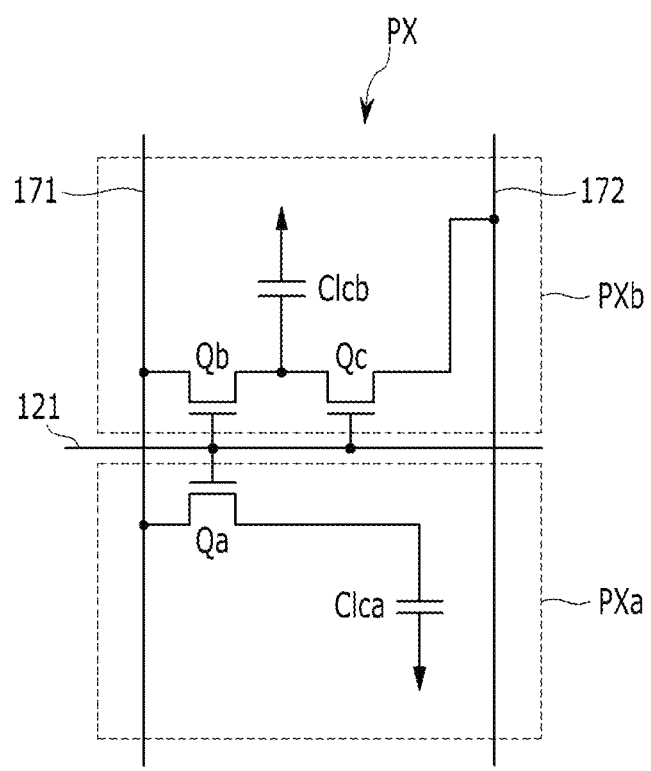
FIG. 1 is a circuit diagram of one pixel according to an exemplary embodiment of the present inventive concept.

The present inventive concept will be described more fully hereinafter with reference to the accompanying drawings, in which exemplary embodiments of the inventive concept are shown.

As those skilled in the art would realize, the described embodiments may be modified in various different ways, all without departing from the spirit or scope of the present inventive concept.

In the drawings, the thickness of layers, films, panels, regions, etc. are exaggerated for clarity.

Like reference numerals designate like elements throughout the specification.

It will be understood that when an element such as a layer, film, region, or substrate is referred to as being "on" another element, it can be directly on the other element or intervening elements may also be present between the element and the other element. In contrast, when an element is referred to as being "directly on" another element, there are no intervening elements present.

A curved display device according to an exemplary embodiment of the present inventive concept will now be described with reference to FIGS. 1 to 5.

Figure 2:
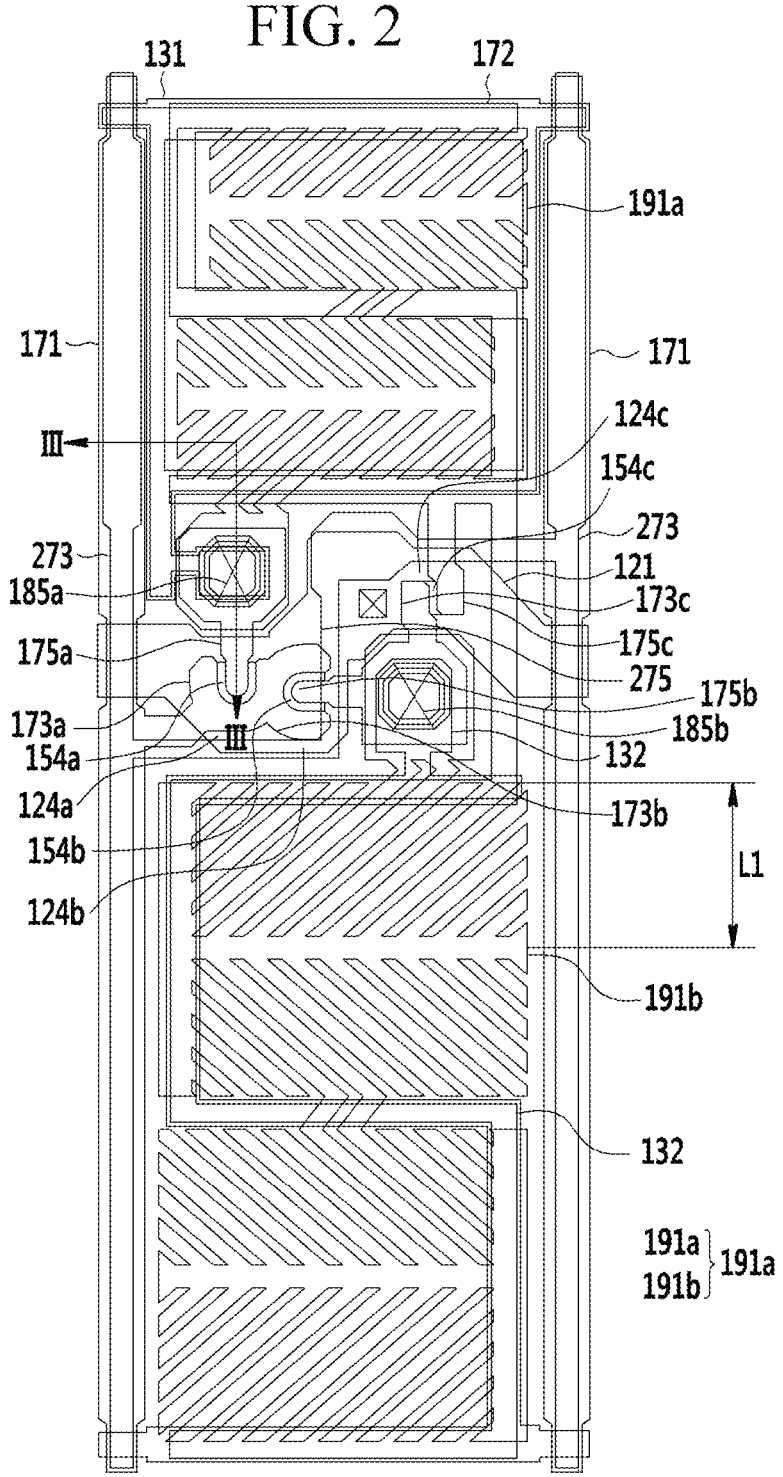
FIG. 2 is a top plan view of one pixel according to the exemplary embodiment of the present inventive concept.
Figure 3:
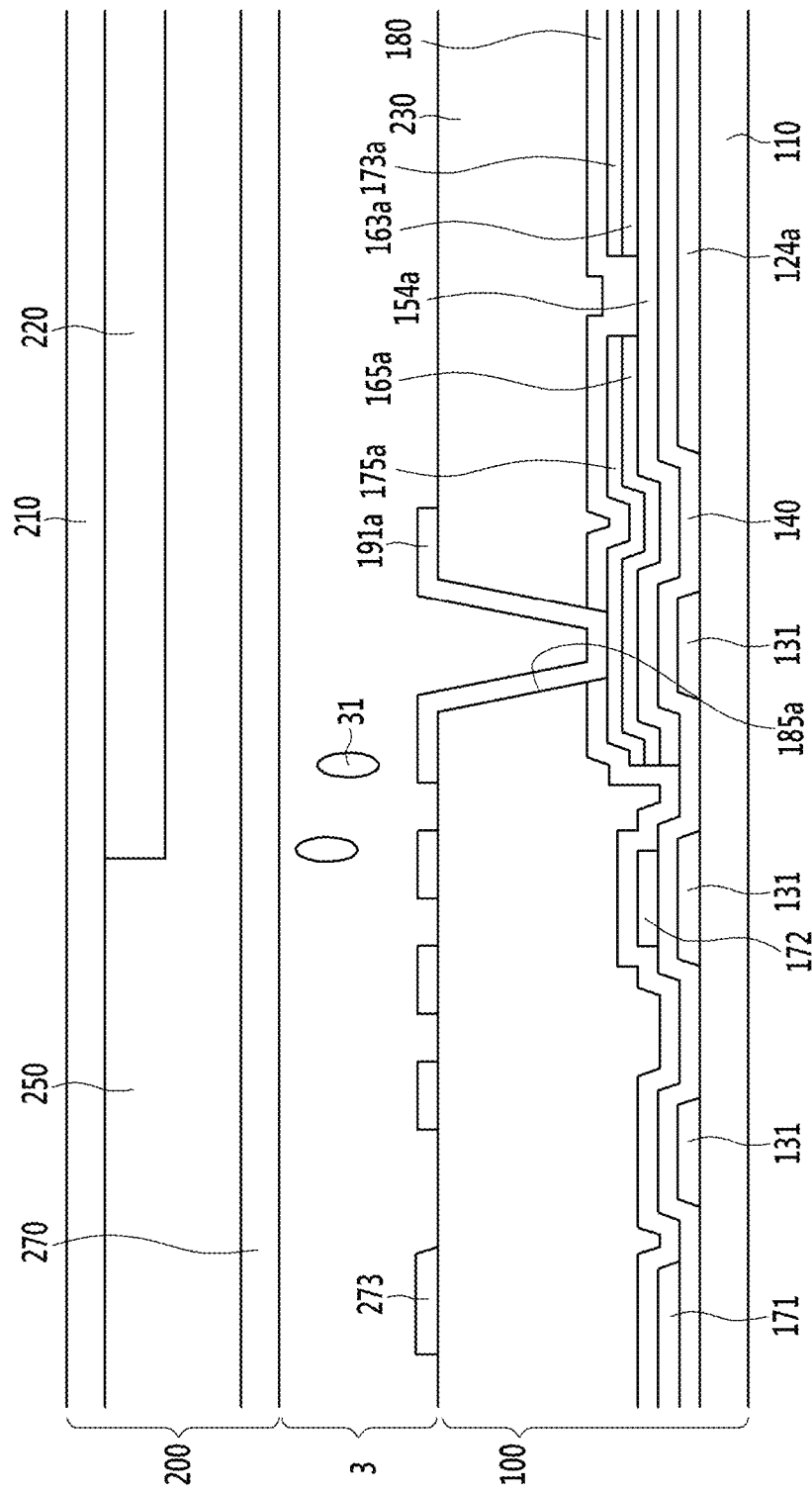
FIG. 3 is a cross-sectional view of FIG. 2 taken along the line III-III.
Figure 4:
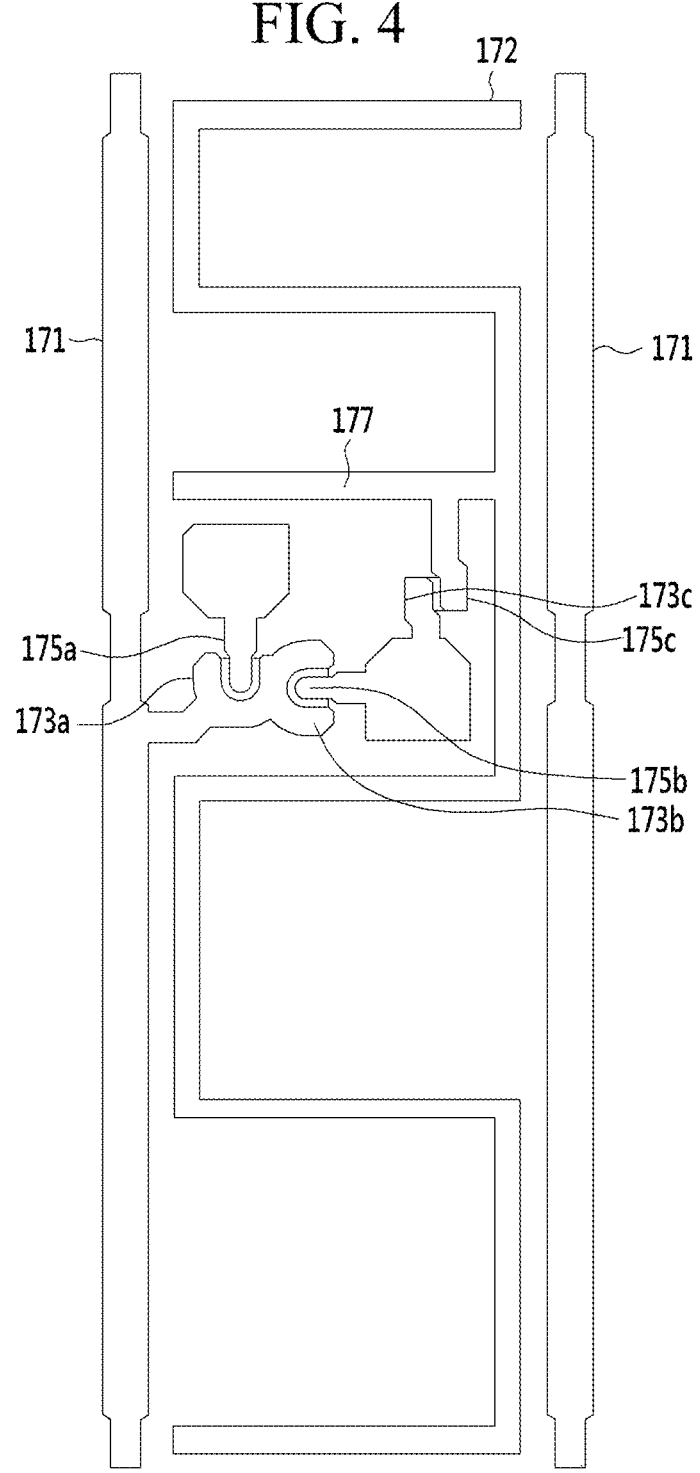
FIG. 4 is a top plan view of a data conductive layer of FIG. 2.
Figure 5:
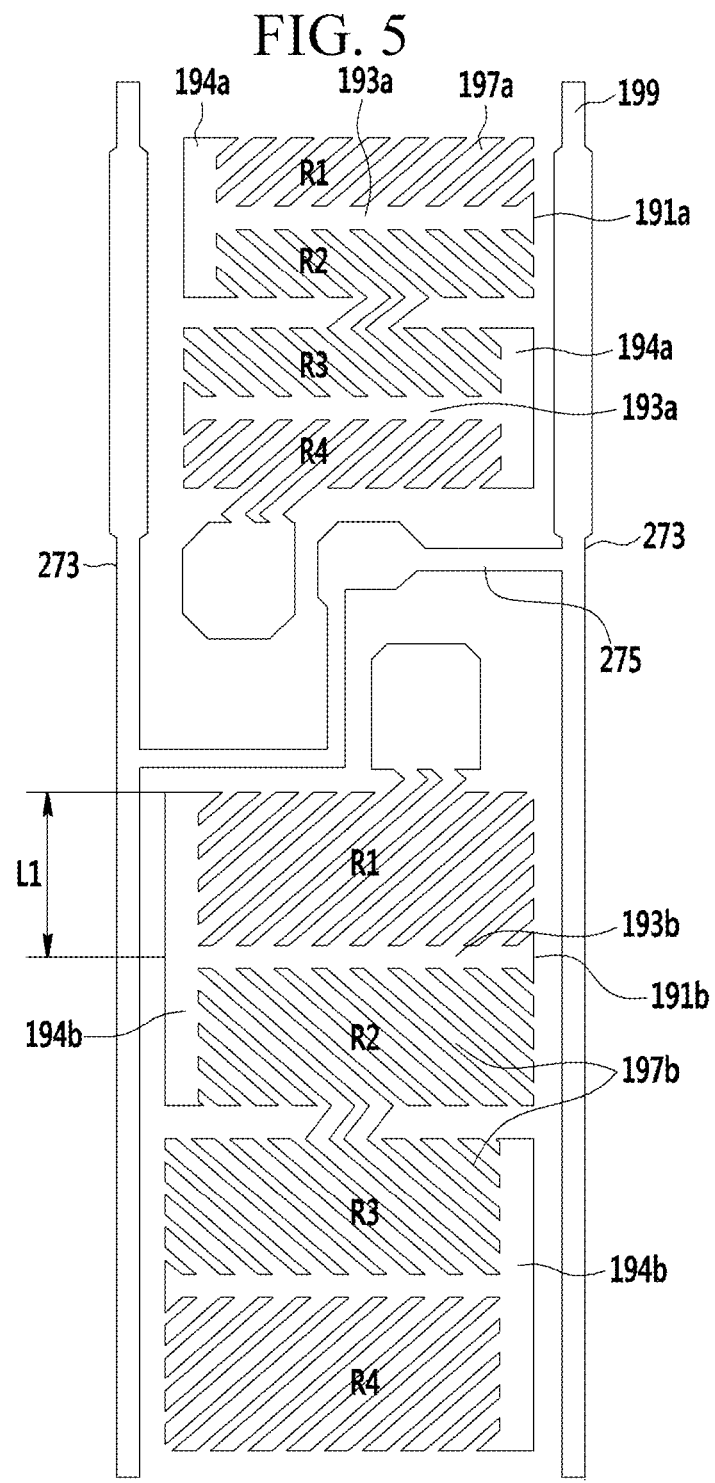
FIG. 5 is a top plan view of a pixel electrode layer of FIG. 2.

FIG. 1 is a circuit diagram of one pixel according to the exemplary embodiment of the present inventive concept, FIG. 2 is a top plan view of one pixel according to the exemplary embodiment of the present inventive concept, FIG. 3 is a cross-sectional view of FIG. 2 taken along the line III-III, FIG. 4 is a top plan view of a data conductive layer of FIG. 2, and FIG. 5 is a top plan view of a pixel electrode layer of FIG. 2.

Referring first to FIG. 1, one pixel PX of the display device according to the present exemplary embodiment includes: a plurality of signal lines including a gate line 121 for transmitting a gate signal, a data line 171 for transmitting a data signal, and a divided reference voltage line 172 for transmitting a divided reference voltage; and first, second, and third switching elements Qa, Qb, and Qc and first and second liquid crystal capacitors Clca and Clcb that are coupled to the plurality of signal lines.

The first and second switching elements Qa and Qb are respectively coupled to the gate line 121 and the data line 171, and the third switching element Qc is coupled to an output terminal of the second switching element Qb and the divided reference voltage line 172.

The first and second switching elements Qa and Qb are three-terminal elements such as thin film transistors and the like, control terminals thereof are coupled to the gate line 121, input terminals thereof are coupled to the data line 171, an output terminal of the first switching element Qa is coupled to the first liquid crystal capacitor Clca, and the output terminal of the second switching element Qb is coupled to the second liquid crystal capacitor Clcb and an input terminal of the third switching element.

The third switching element Qc is also a three-terminal element such as a thin film transistor and the like, a control terminal thereof is coupled to the gate line 121, the input terminal thereof is coupled to the second liquid crystal capacitor Clcb, and an output terminal thereof is coupled to the divided reference voltage line 172.

When a gate-on signal is applied to the gate line 121, the first, second, and third switching elements Qa, Qb, and Qc connected thereto are turned on.

Accordingly, a data voltage applied to the data line 171 is applied to a first subpixel electrode PXa and a second subpixel electrode PXb through the turned-on first and second switching elements Qa and Qb.

In this case, the data voltages applied to the first and second subpixel electrodes PXa and PXb are identical to each other, and the first and second liquid crystal capacitors Clca and Clcb are charged with the same amount of charges corresponding to a difference between a common voltage and the data voltage.

Simultaneously, a voltage charged to the second liquid crystal capacitor Clcb is divided by the turned-on third switching element Qc.

Thus, the voltage charged to the second liquid crystal capacitor Clcb is decreased by a difference between the common voltage and the divided reference voltage.

As a result is, a voltage charged to the first liquid crystal capacitor Clca becomes higher than the voltage charged to the second liquid crystal capacitor Clcb.

As such, the voltages charged to the first and second liquid crystal capacitors Clca and Clcb are different from each other.

Since the voltages of the first and second liquid crystal capacitors Clca and Clcb are different from each other, tilt angles of liquid crystal molecules of the first and second subpixels are different, thereby obtaining the two subpixels of different luminances.

Accordingly, when the voltages of the first and second liquid crystal capacitors Clca and Clcb are appropriately adjusted, an image difference between an image viewed from a front side and an image viewed from a lateral side may be decreased, thereby improving side visibility.

In the illustrated exemplary embodiment, the third switching element Qc coupled to the second liquid crystal capacitor Clcb and the divided reference voltage line 172 is included to make the voltages charged to the first and second liquid crystal capacitors Clca and Clcb different, but the second liquid crystal capacitor Clcb may be coupled to a step-down capacitor according to another exemplary embodiment of the present inventive concept. Specifically, the third switching element including a first terminal coupled to a step-down gate line, a second terminal coupled to the second liquid crystal capacitor Clcb, and a third terminal coupled to the step-down capacitor may be included such that an amount of charges charged in the second liquid crystal capacitor Clcb may be partially charged in the step-down capacitor, thereby differently setting the charged voltages between the first and second liquid crystal capacitors Clca and Clcb.

In addition, according to another exemplary embodiment of the present inventive concept, the first and second liquid crystal capacitors Clca and Clcb are respectively coupled to different data lines such that they are applied with different data voltages, thereby differently setting the charged voltages between the first and second liquid crystal capacitors Clca and Clcb.

Alternatively, the charged voltages of the first and second liquid crystal capacitors Clca and Clcb may be set differently using various different methods.

These will be described in more detail with reference to FIGS. 13 to 16.

Next, referring to FIGS. 2 and 3, a gate conductor including a gate line 121 and storage electrode lines 131 and 132 is disposed on a first insulation substrate 110 that is formed of transparent glass, plastic, or the like.

The gate line 121 includes gate electrodes 124a, 124b and 124c, and a wide end portion (not shown) for connection with another layer or an external driving circuit.

The gate line 121 and the storage electrode lines 131 and 132 may be formed of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), etc.

The gate line 121 may have a multilayer structure in which at least two conductive layers having different physical properties are included.

The gate line 121 crosses a pixel area in a row direction.

A first subpixel electrode 191a for displaying a high gray may be disposed above of the gate line 121, a second subpixel electrode 191b for displaying a low gray may be disposed below thereof, and their positions can be interchanged.

The storage electrode lines 131 and 132 are formed of the same material as the gate line 121, and may be integrally formed with the gate line 121.

The first storage electrode line 131 disposed above the gate line 121 may have a quadrangular shape that encloses the first subpixel electrode 191a.

An uppermost side of the quadrangular shaped first storage electrode line 131 may horizontally extends and be coupled to another layer or an external driving circuit.

The second storage electrode line 132 disposed below the gate line 121 includes a plurality of horizontal portions, and a plurality of vertical portions that interconnect the plurality of horizontal portions.

In the present specification, as described above, shapes of the storage electrode lines 131 and 132 are described and illustrated, but they are not limited thereto and may have any shapes for performing the same function.

A gate insulating layer 140 is disposed on the gate conductor.

A first semiconductor layer 154a, a second semiconductor layer 154b, and a third semiconductor layer 154c are disposed on the gate insulating layer 140.

A plurality of ohmic contacts 163a and 165a are disposed on the semiconductor layers 154a, 154b, and 154c, and may be omitted if the semiconductor layers 154a, 154b, and 154c are formed of an oxide semiconductor material.

A data line 171 including source electrodes 173a, 173b, and 173c and a data conductor including drain electrodes 175a, 175b, and 175c and a divided reference voltage line 172 are formed on the ohmic contacts 163a and 165a and the gate insulating layer 140.

The data conductor, the ohmic contacts, and the semiconductor layers disposed therebelow may be simultaneously patterned using one mask.

FIG. 4 is a top plan view of a data conductor layer according to the exemplary embodiment of the present inventive concept.

The data conductor includes the data line 171, a first source electrode 173a, a second source electrode 173b, a third source electrode 173c, a first drain electrode 175a, a second drain electrode 175b, a third drain electrode 175c, and the divided reference voltage line 172.

The data line 171 extends in a column direction along an edge of one pixel area, and includes the first and second source electrodes 173a and 173b.

The first and second source electrode 173a and 173b may have a U-shape, but they are not limited thereto.

The first drain electrode 175a faces the first source electrode 173a and has, as an example, an I-shape, and includes a widely expanded region that is coupled to the first subpixel electrode 191a.

Similarly, the second drain electrode 175b faces the second source electrode 173b and has, as an example, an I-shape, and includes a widely expanded region that is connected to the second subpixel electrode 191b.

The third source electrode 173c is formed to extend from the second drain electrode 175b.

In addition, the data conductor includes the divided reference voltage line 172, and the divided reference voltage line 172 includes the third drain electrode 175c that form the thin film transistor.

Referring to FIG. 4, the divided reference voltage line 172 includes a plurality of horizontal portions and a plurality of vertical portions interconnecting adjacent horizontal portions.

That is, in the divided reference voltage line 172, the plurality of horizontal portions and the plurality of vertical portions for interconnecting them may be included such that the vertical portions connect adjacent horizontal portions that are parallel to each other.

As an example, when the first and second horizontal portions are connected by the vertical portion at their left sides, the second and the third horizontal portions may be connected by the vertical portion at their right sides.

The divided reference voltage line 172 may respectively have different shapes depending on shapes of the first and second subpixel electrodes 191a and 191b.

The divided reference voltage line 172 disposed in the first and second subpixel electrodes 191a and 191b may respectively include three horizontal portions and two vertical portions that are respectively formed to overlap a first vertical stem portion 194a, a second vertical stem portion 194b, first minute branch portions 197a, and second minute branch portions 197b.

These are arranged according to a shape of a pixel electrode 191, and a shape of the divided reference voltage line 172 may also be modified as the shape of the pixel electrode 191 is modified.

Specifically, the divided reference voltage line 172 disposed in the first subpixel electrode 191a partially overlaps ends of the first vertical stem portion 194a and the first minute branch portions 197a.

The divided reference voltage line 172 disposed in the second subpixel electrode 191b may partially overlap ends of the second vertical stem portion 194b and the second minute branch portions 197b.

In the divided reference voltage line 172 disposed in the first subpixel electrode 191a, a lowermost part of a horizontal portion 177 may extend downwardly and form the third drain electrode 175c which faces the third source electrode 173c.

The first gate electrode 124a, the first source electrode 173a, and the first drain electrode 175a that are described above form a first thin film transistor (TFT) Qa along with the first semiconductor layer 154a, and a channel of the TFT is formed in the first semiconductor layer 154a between the first source electrode 173a and the first drain electrode 175a.

Similarly, the second gate electrode 124b, the second source electrode 173b, and the second drain electrode 175b form a second TFT Qb along with the second semiconductor layer 154b, and a channel of the TFT is formed in the second semiconductor layer 154b between the second source electrode 173b and the second drain electrode 175b, while the third gate electrode 124c, the third source electrode 173c, and the third drain electrode 175c form a third TFT Qc along with the third semiconductor layer 154c, and a channel of the TFT is formed in the third semiconductor layer 154c between the third source electrode 173c and the third drain electrode 175c.

A passivation layer 180 is disposed on the data conductor and the exposed semiconductor layers 154a, 154b, and 154c.

The passivation layer 180 may be formed of a material such as a silicon nitride, a silicon oxide, or the like used to form an inorganic insulating layer.

When the passivation layer 180 is disposed below a color filter 230, it prevents a pigment of the color filter 230 from being introduced into the exposed semiconductor layers 154a, 154b, and 154c.

The color filter 230 may be disposed on the passivation layer 180.

The color filter 230 may uniquely display one of primary colors, and the primary colors may be, for example, three primary colors such as red, green, and blue, or yellow, cyan, magenta, and the like.

Though not illustrated, the color filter 230 may further include a color filter 230 for displaying mixed colors of the primary colors or white.

A first contact hole 185a and a second contact hole 185b are disposed in the passivation layer 180 and the color filter 230 to expose the first and second drain electrodes 175a and 175b.

The pixel electrode 191 is disposed on the color filter 230.

The pixel electrode 191 includes the first and second subpixel electrodes 191a and 191b that are separated from each other while interposing the gate line 121 therebetween and neighbor each other in the column direction.

The pixel electrode 191 may be formed of a transparent material such as ITO, IZO, etc.

The pixel electrode 191 may be formed of a transparent conductive material such as ITO or IZO, or a reflective metal such as aluminum, silver, chromium, or an alloy thereof.

A shielding electrode 199 formed of the same material as the pixel electrode 191 is disposed in the same layer as the pixel electrode 191 on the color filter 230.

The pixel electrode 191 and the shielding electrode 199 may be simultaneously formed in the same process.

The pixel electrode 191 and the shielding electrode 199 according to the present inventive concept will now be described with reference to FIG. 5.

The shielding electrode 199 will be described first.

The shielding electrode 199 include vertical portions 273 overlapping the data lines that are disposed at the edge of one pixel area, and at least one horizontal portion 275 for interconnecting the neighboring vertical portions 273.

An expansion may be provided in the middle of the horizontal portion 275 of the shielding electrode 199.

The same voltage as that of the common electrode (not shown) is applied to the shielding electrode 199.

No electric field is generated between the shielding electrode 199 and the common electrode. Thus, the liquid crystal layer interposed therebetween maintains an initial configuration which blocks light pass through the liquid crystal layer. As a result, no unwanted light leakage is generated between the pixel electrode 193a and 193b, and the data line 171.

When the liquid crystals exhibit black as described above, the liquid crystal molecules themselves may perform a function of the light blocking member.

Accordingly, the light blocking member usually disposed in the upper panel may be eliminated in the LCD that includes the lower panel according to the exemplary embodiment of the present inventive concept.

That is, the liquid crystal molecules between the shielding electrode and the common electrode perform the function of the light blocking member.

The pixel electrode 191 will now be described.

The pixel electrode 191 includes the first subpixel electrode 191a and the second subpixel electrode 191b that are separated while interposing the gate line 121 therebetween and neighbor each other in the column direction.

The first subpixel electrode 191a includes a first horizontal stem portion 193a that extends in the row direction (extending direction of the gate line), the first vertical stem portion 194a that extends from one end of the first horizontal stem portion 193a to be perpendicular thereto, and the plurality of first minute branch portions 197a that diagonally extend from the first horizontal stem portion 193a and the first vertical stem portion 194a.

The first minute branch portions 197a extending from the first horizontal stem portion 193a and the first vertical stem portion 194a obliquely extend in a direction away from the first vertical stem portion 194a.

As an example, the first subpixel electrode 191a includes two first horizontal stem portions 193a and two first vertical stem portions 194a. The first minute branch portions 197a extending from the first horizontal stem portion and the first vertical stem portion may have different extending directions.

Referring to FIG. 5, one of the first horizontal stem portions 193a is coupled to the left of the first vertical stem portion 194a, while the other one of the first horizontal stem portions 193a is coupled to the right of the first vertical stem portion 194a.

The first minute branch portions 197a upwardly extending from the first horizontal stem portion 193a coupled to the right of the first vertical stem portion 194a extend in the upper right direction, while the first minute branch portions 197a downwardly extending from the first horizontal stem portion 193a extend in the lower right direction.

In addition, the first minute branch portions 197a upwardly extending from the first horizontal stem portion 193a coupled to the left of the first vertical stem portion 194a extend in the upper left direction, while the first minute branch portions 197a downwardly extending from the first horizontal stem portion 193a extend in the lower left direction.

However, the directions are exemplarily illustrated and thus numerous variations and combinations thereof may also be possible.

The first subpixel electrode 191a includes a plurality of regions R1, R2, R3, and R4 that are divided by extending directions of the first horizontal stem portion 193a, the first vertical stem portion 194a, and the first minute branch portions 197a.

In this case, the first horizontal stem portion 193a, the first vertical stem portion 194a and a gap between the adjacent first minute branch portions 197a form a border between the neighboring regions R1, R2, R3, and R4.

The plurality of first minute branch portions 197a disposed in the regions R1, R2, R3, and R4 may respectively extend in the different directions.

Particularly, the minute branch portions 197a of the adjacent regions R1, R2, R3, and R4 may form an angle of about 90° or about 180°.

The extending directions of the minute branch portions 197a of each of the regions R1, R2, R3, and R4 may be predetermined.

In this case, sides of the first minute branch portions 197a distort the electric field to create a horizontal component for determining tilt directions of liquid crystal molecules 31.

The horizontal component of the electric field is substantially parallel to the sides of the first minute branch portions 197a.

The liquid crystal molecules 31 are tilted in a direction parallel to a length direction of the first minute branch portions 197a.

Thus, the liquid crystal molecules 31 disposed in the first region R1 are arranged in the upper right direction, the liquid crystal molecules 31 disposed in the second region R2 are arranged in the lower right direction, the liquid crystal molecules 31 disposed in the third region R3 are arranged in the upper left direction, and the liquid crystal molecules 31 disposed in the fourth region R4 are arranged in the lower left direction.

Since the first subpixel electrode 191a includes the four regions R1 to R4 in which the extending directions of the first minute branch portions 197a are respectively different, the tilt directions of the liquid crystal molecules 31 are roughly tilted in four directions, and the four regions in which the alignment directions of the liquid crystal molecules 31 are different are formed in the liquid crystal layer 3.

That is, the plurality of regions (e.g., four regions) in which the alignment directions of the liquid crystal molecules 31 are different are divided by the first vertical stem portion, the first horizontal stem portion and the gap.

As such, when the liquid crystal molecules are tilted in various directions, a reference viewing angle of the liquid crystal display becomes wider.

Minute slits where a part of the electrode is removed are formed between the adjacent first minute branch portions 197a.

Widths of the first minute branch portions 197a and the minute slits may be about 5 to 8 μm, but they are not limited thereto.

In addition, a ratio of the width of the first minute branch portions 197a to the width of the minute slits may be about 1.5:1 to about 1:1.5, but it is not limited thereto, and may be appropriately adjusted in consideration of display characteristics.

An acute angle formed between the first minute branch portions 197a and the first horizontal stem portion 193a may be about 40° to about 45°, but it is not limited thereto, and may be appropriately adjusted in consideration of the display characteristics such as visibility and the like of the LCD.

Some of the first minute branch portions 197a extending from the neighboring first horizontal stem portions 193a, for example, the branch portions 197a from the second region R2 and the third region R3, may be coupled to each other.

In addition, the first minute branch portions 197a in the fourth region R4 may extend to form expanded portion of the first subpixel electrode. The first minute branch portions 197a may be supplied with the data voltage from the data line through the first drain electrode 175a in which the first minute branch portions 197a are connected through the first contact hole 185a.

A shape of the second subpixel electrode 191b according to the exemplary embodiment of the present inventive concept is similar to that of the first subpixel electrode 191a.

The second subpixel electrode 191b includes a second horizontal stem portion 193b that extends in the row direction (extending direction of the gate line), the second vertical stem portion 194b that extends from one end of the second horizontal stem portion 193b to be perpendicular thereto, and the plurality of second minute branch portions 197b that diagonally extend from the second horizontal stem portion 193b and the second vertical stem portion 194b.

The second minute branch portions 197b extending from the second horizontal stem portion 193b and the second vertical stem portion 194b obliquely extend in a direction away from the second vertical stem portion 194b.

As an example, the second subpixel electrode 191b includes two second horizontal stem portions 193b and two first vertical stem portions 194b, and the second minute branch portions 197b respectively extending from the second horizontal stem portion and the second vertical stem portion may have different extending directions.

Referring to FIG. 5, one of the second horizontal stem portions 193b is coupled to the left of the second vertical stem portion 194b, while the other one of the second horizontal stem portions 193b is coupled to the right of the second vertical stem portion 194b.

The second minute branch portions 197b upwardly extending from the second horizontal stem portion 193b coupled to the right of the second vertical stem portion 194b extend in the upper right direction, while the second minute branch portions 197b downwardly extending from the second horizontal stem portion 193b extend in the lower right direction.

In addition, the second minute branch portions 197b upwardly extending from the second horizontal stem portion 193b coupled to the right of the second vertical stem portion 194b extend in the upper left direction, while the second minute branch portions 197b downwardly extending from the second horizontal stem portion 193b extend in the lower left direction.

However, the directions are exemplarily illustrated, and thus numerous variations and combinations thereof may be also possible.

The second subpixel electrode 191b includes a plurality of regions R1, R2, R3, and R4 that are divided by extending directions of the second horizontal stem portion 193b, the second vertical stem portion 194b, and the second minute branch portions 197b.

The second horizontal stem portion 193b, the second vertical stem portion 194b, and a gap form a border between the neighboring regions R1, R2, R3, and R4.

The arrangement directions of the liquid crystals of the plurality of regions of the second subpixel electrode 191b may respectively correspond to those of the plurality of regions of the first subpixel electrode 191a.

The plurality of second minute branch portions 197b disposed in the regions R1, R2, R3, and R4 may respectively extend in different directions.

Particularly, the minute branch portions 197b of the adjacent regions R1, R2, R3, and R4 may form an angle of about 90° or about 180°.

The extending directions of the minute branch portions 197a of the regions R1, R2, R3, and R4 may be predetermined.

In this case, sides of the second minute branch portions 197b distort the electric field to create a horizontal component for determining tilt directions of the liquid crystal molecules 31.

The horizontal component of the electric field is nearly parallel to the sides of the second minute branch portions 197b.

The liquid crystal molecules 31 are tilted in a direction parallel to a length direction of the second minute branch portions 197b.

Thus, a long axis of the liquid crystal molecules 31 disposed in the first region R1 are arranged in the upper right direction, the liquid crystal molecules 31 disposed in the second region R2 are arranged in the lower right direction, the liquid crystal molecules 31 disposed in the third region R3 are arranged in the upper left direction, and the liquid crystal molecules 31 disposed in the fourth region R4 are arranged in the lower left direction.

Since the second subpixel electrode 191b includes the four regions R1 to R4 in which the extending directions of the second minute branch portions 197b are respectively different, the liquid crystal molecules 31 are roughly tilted in four directions, and the four regions in which the alignment directions of the liquid crystal molecules 31 are different are formed in the liquid crystal layer 3.

That is, the plurality of regions (e.g., four regions) in which the alignment directions of the liquid crystal molecules 31 are different are divided by the second vertical stem portion, the second horizontal stem portion and the gap.

As such, when the liquid crystal molecules are tilted in various directions, a reference viewing angle of the liquid crystal display becomes wider.

Minute slits where a part of the electrode is removed are formed between the adjacent second minute branch portions 197b.

Widths of the second minute branch portions 197b and the minute slits may be about 5 to 8 μm, but they are not limited thereto.

In addition, a ratio of the widths of the second minute branch portion 197b to the width of the minute slits may be about 1.5:1 to about 1:1.5, but it is not limited thereto, and may be appropriately adjusted in consideration of display characteristics.

An acute angle formed between the second minute branch portions 197b and the second horizontal stem portion 193b may be about 40° to about 45°, but it is not limited thereto, and may be appropriately adjusted in consideration of the display characteristics such as visibility and the like of the LCD.

Some of the second minute branch portions 197b extending from the neighboring second horizontal stem portions 193b may be coupled to each other.

In addition, the rest of the second minute branch portions 197b may be coupled to an expanded portion of the second subpixel electrode to be supplied with the voltage from the second drain electrode 175b through the second contact hole 185b.

In this case, the data voltage applied to the second drain electrode 175b is partially divided by the third source electrode 173c such that the voltage applied to the first subpixel electrode 191a is greater than that applied to the second subpixel electrode 191b.

As described above, the first and second subpixel electrodes 191a and 191b respectively include the four regions R1 to R4 in which the alignment directions of the liquid crystal molecules 31 are respectively different.

A size of each region can be determined by a vertical length of each region. Among the plurality of regions, the region having the longest vertical length according to the exemplary embodiment of the present inventive concept has a vertical length L1 of less than about 100 μm.

In addition, referring to FIG. 5, sizes of the plurality of regions included in the first subpixel electrode 191a are smaller than those of the plurality of regions included in the second subpixel electrode 191b.

Thus, among the plurality of regions included in the first and second subpixel electrodes 191a and 191b, the regions having the longer vertical lengths are included in the second subpixel electrode 191b, and each of the plurality of regions included in the second subpixel electrode 191b has a vertical length L1 of less than about 100 μm. The second subpixel may have lower gray than that of the first subpixel.

As such, when the vertical length of each of the regions having the different alignment directions of the liquid crystal molecules 31 are controlled to have less than about 100 μm, horizontal smudge and decreased luminance in a larger size display device may be controlled. The decreased luminance due to horizontal smudge may become worse in a curve LCD display device because a misalignment between the lower panel 100 and the upper panel 200 becomes larger in the curved LCD display. By controlling the vertical length of each of the regions in a curved LCD display device to have less than about 100 μm, the decreased luminance may be effectively controlled. An upper panel 200 will now be described.

A light blocking member 220 is disposed on a second insulation substrate 210 that is formed of transparent glass or plastic and faces the first insulation substrate 110.

The light blocking member 220 is referred to as a black matrix and prevents unwanted leakage of light.

The light blocking member 220 according to the exemplary embodiment of the present inventive concept may extend in the row direction along the gate line 121.

As shown in the exemplary embodiment of the present inventive concept, when the color filter 230 is disposed in the lower panel 100, the color filter of the upper panel 200 may be omitted, but it is not limited thereto, and the color filter may be disposed on the second insulation substrate 210.

On the contrary, according to the exemplary embodiment of the present inventive concept, the light blocking member 220 disposed in the second insulation substrate 210 may also be disposed on the first insulation substrate 110.

An overcoat 250 is disposed on the light blocking member 220.

The overcoat 250 may be formed of an (organic) material, prevent the light blocking member 220 from being exposed, and provide a flat surface.

The overcoat 250 may be omitted.

A common electrode 270 is disposed on the overcoat 250.

The common electrode 270 may be formed of the same material as the pixel electrode 191, and has a planar shape to be applied with the common voltage.

In addition, an alignment layer (not shown) may be disposed on the pixel electrode 191 and the common electrode 270.

The liquid crystal layer 3 is disposed between the lower panel 100 and the upper panel 200.

The liquid crystal layer 3 has negative dielectric anisotropy, and the liquid crystal molecules 31 of the liquid crystal layer 3 are aligned such that their long axes are perpendicular to surfaces of the two display panels 100 and 200 when no electric field is present.

The first and second subpixel electrodes 191a and 191b to which the data voltage is applied generate the electric field along with the common electrode 270 of the upper panel 200, thereby determining the alignment directions of the liquid crystal molecules of the liquid crystal layer 3 that are disposed between the two electrodes 191 and 270.

Depending on the alignment directions of the liquid crystal molecules, luminance of light passing through liquid crystal layer 3 is controlled.

In the exemplary embodiment of the present inventive concept, the pixel electrodes illustrated in FIG. 2 may be arranged in a matrix form, which represents that, when one pixel electrode is configured as one pixel area, the plurality of pixel electrodes are not symmetrically or alternately arranged.

According to the aforementioned exemplary embodiment of the present inventive concept, the first subpixel electrode or the second subpixel electrode is divided by the vertical and horizontal stem portions into the plurality of regions in which the alignment directions of the liquid crystal molecules are respectively different, and the horizontal smudge or the decreased luminance that may occur in the display device can be controlled by limiting the vertical length of each of the plurality of regions.

In addition, the aforementioned display device may be a flat panel display device, but it is not limited thereto, and may also be a curved display device.

Particularly, the aforementioned display device may a curved display device that is curved in a direction of its long side.

A pixel electrode according to another exemplary embodiment of the present inventive concept will now be described with reference to FIG. 6.

Figure 6:
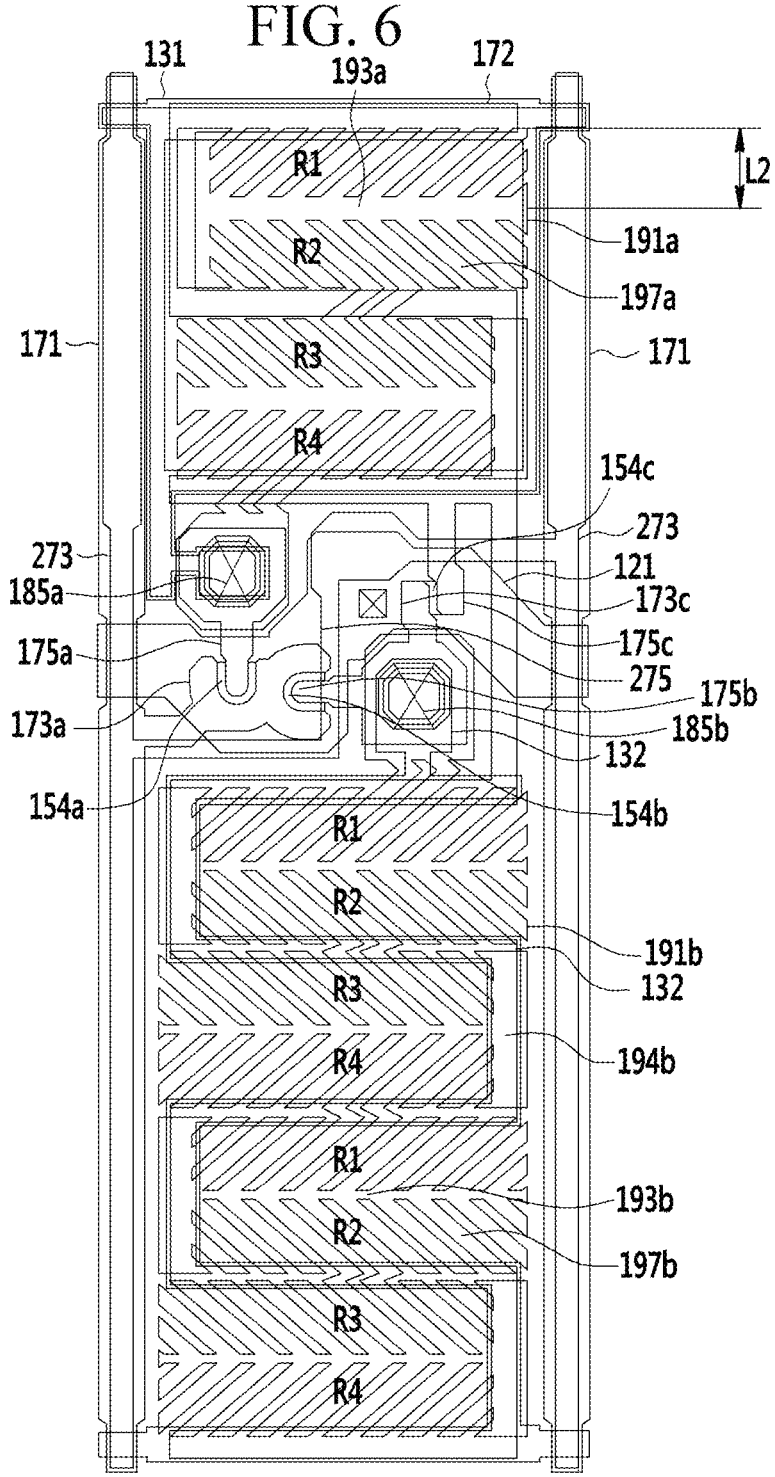
FIG. 6 is a top plan view of one pixel according to another exemplary embodiment of the present inventive concept.

FIG. 6 is a top plan view of one pixel according to another exemplary embodiment of the present inventive concept.

A different structure from that of the previous exemplary embodiment of the present inventive concept will now be described, and the aforementioned description of FIG. 2 to FIG. 5 will be referenced for the omitted description.

First, a first subpixel electrode 191a according to the current exemplary embodiment of the present inventive concept is the same as that of the previous exemplary embodiment of the present inventive concept.

A second subpixel electrode 191b according to the current exemplary embodiment of the present inventive concept includes a larger number of second horizontal stem portions 193b and second vertical stem portions 194b than that of the first subpixel electrode 191a in the aforementioned description of FIG. 2 to FIG. 5.

As the display device becomes larger, a size of one pixel electrode increases.

In this case, as in the previous exemplary embodiment, when the second subpixel electrode 191b includes four regions that are divided by two horizontal stem portions and two vertical stem portions, a vertical length of one region increases to cause the horizontal smudge.

Accordingly, in the case of the larger display device, as shown in the current exemplary embodiment of the present inventive concept, the large number of second horizontal stem portions and second vertical stem portions are included to control the size of each region that is divided by the arrangement of the liquid crystal molecules, thereby reducing the horizontal smudge or the decreased luminance.

Referring to FIG. 6, the second subpixel electrode 191b includes a second horizontal stem portion 193b that extends in the row direction (extending direction of the gate line), a second vertical stem portion 194b that extends from one end of the second horizontal stem portion 193b to be perpendicular thereto, and a plurality of second minute branch portions 197b that diagonally extend from the second horizontal stem portion 193b and the second vertical stem portion 194b.

The second minute branch portions 197b extending from the second horizontal stem portion 193b and the second vertical stem portions 194b obliquely extend in a direction away from the second vertical stem portion 194b.

The second subpixel electrode 191b includes four second horizontal stem portions 193b and four second vertical stem portions 194b, and the second minute branch portions 197b extending from each of the second horizontal stem portion and the second vertical stem portion may respectively have different extending directions.

Referring to FIG. 6, some of the second vertical stem portions 194b are coupled to the left of the second horizontal stem portion 193b, while the rest of the second vertical stem portions 194b are coupled to the right of the second horizontal stem portion 193b.

The second vertical stem portions 194b respectively coupled to the left and right sides may be alternately disposed with respect to each other.

The second minute branch portions 197b disposed above of the second horizontal stem portion 193b that is coupled to the right of the second vertical stem portion 194b extend in an upper right direction, while the second minute branch portions 197b disposed below of the second horizontal stem portion 193b extend in a lower right direction.

In addition, the second minute branch portions 197b extending above of the second horizontal stem portion 193b that is coupled to the left of the second vertical stem portion 194b extend in an upper left direction, while the second minute branch portions 197b extending below of the second horizontal stem portion 193b extend in a lower left direction.

In the present exemplary embodiment, the second horizontal stem portion 193b coupled to the left of the second vertical stem portion 194b and the second horizontal stem portion 193b coupled to the right of the second vertical stem portion 194b are repeated.

The second subpixel electrode 191b includes a plurality of regions R1, R2, R3, and R4 that are divided by extending directions of the second horizontal stem portion 193b, the second vertical stem portion 194b, and the second minute branch portions 197b.

In this case, the second horizontal stem portion 193b, the second vertical stem portion 194b, and a gap form a border between the neighboring regions R1, R2, R3, and R4.

Referring to FIG. 6, the plurality of regions R1 to R4 divided by the extending directions of the second minute branch portions 197b may be repeated twice.

The plurality of second minute branch portions 197b disposed in the regions R1, R2, R3, and R4 may respectively extend in different directions.

Particularly, the second minute branch portions 197b of the adjacent regions R1, R2, R3, and R4 may form an angle of about 90° or about 180°.

The extending directions of the minute branch portions 197a of the regions R1, R2, R3, and R4 may be predetermined.

In this case, sides of the second minute branch portions 197b distort the electric field to create a horizontal component for determining tilt directions of the liquid crystal molecules 31.

The horizontal component of the electric field is nearly parallel to the sides of the second minute branch portions 197b.

The liquid crystal molecules are tilted in a direction parallel to a length direction of the second minute branch portions 197b.

Thus, the liquid crystal molecules 31 disposed in the first region R1 are arranged in the upper right direction, the liquid crystal molecules 31 disposed in the second region R2 are arranged in the lower right direction, the liquid crystal molecules 31 disposed in the third region R3 are arranged in the upper left direction, and the liquid crystal molecules 31 disposed in the fourth region R4 are arranged in the lower left direction.

Since the second subpixel electrode 191b includes the four regions R1 to R4 in which the extending directions of the second minute branch portions 197b are respectively different, the tilt directions of the liquid crystal molecules 31 are roughly tilted in four directions, and the four regions in which the alignment directions of the liquid crystal molecules 31 are different are formed in the liquid crystal layer 3.

The plurality of regions (e.g., four regions) in which the alignment directions of the liquid crystal molecules 31 are different are divided by the second vertical stem portion and the second horizontal stem portion.

As such, when the liquid crystal molecules are tilted in various directions, a reference viewing angle of the liquid crystal display becomes wider.

Minute slits where a part of the electrode is removed are formed between the adjacent second minute branch portions 197b.

Widths of the first minute branch portions 197a and the minute slits may be about 5 to about 8 μm, but they are not limited thereto.

In addition, a ratio of the width of the second minute branch portions 197b to the width of the minute slits may be about 1.5:1 to about 1:1.5, but it is not limited thereto, and may be appropriately adjusted in consideration of display characteristics.

An acute angle formed between the second minute branch portions 197b and the second horizontal stem portion 193b may be about 40° to about 45°, but it is not limited thereto, and may be appropriately adjusted in consideration of the display characteristics such as visibility and the like of the LCD.

Some of the second minute branch portions 197b extending from the neighboring second horizontal stem portion 193b, for example, the branch portions 197b from the second region R2 and the third region R3, may be coupled to each other.

In addition, the second minute branch portions 197b in the fourth region R4 may extend to form expanded portion of the first subpixel electrode. The second minute branch portions 197b may be supplied with the data voltage from the data line through the second drain electrode 175b in which the second minute branch portions 197b are connected through the second contact hole 185b.

As described above, the first and second subpixel electrodes 191a and 191b respectively include the four regions R1 to R4 that are divided by the alignment directions of the liquid crystal molecules 31.

In this case, a size of each region can be determined by a vertical length of each region, and among the plurality of regions, the region having the longest vertical length according to the exemplary embodiment of the present inventive concept has a vertical length L2 of less than about 100 μm.

In addition, referring to FIG. 6, sizes of the plurality of regions included in the first subpixel electrode 191a are greater than those of the plurality of regions included in the second subpixel electrode 191b.

Thus, the region that has the longest vertical length in one pixel area which may cause the horizontal smudge is disposed in the first subpixel electrode 191a, and each of the plurality of regions included in the first subpixel electrode 191a is formed to have a vertical length L2 of less than about 100 μm.

Another exemplary embodiment of the present inventive concept is an exemplary embodiment having a larger pixel size in which the vertical length of one region also increases according to the increase in size of one pixel electrode. The another exemplary embodiment of the present inventive concept may prevent horizontal smudge of the large display device by controlling the vertical length of the regions R1, R2, R3 and R4 less that about 100 μm.

Accordingly, as for the display device having the larger size, as in the current exemplary embodiment of the present inventive concept, the size of each region in which the liquid crystal molecules are arranged is controlled by the larger number of the second horizontal stem portions and the second vertical stem portions, thereby reducing the vertical smudge and the decreased luminance. According to the inventive concept, the number of the horizontal stem portions and the vertical stem portions in the first subpixel electrode and the second subpixel electrode is not same. According to the inventive concept, the number of the subdomain (the number of regions) in the first subpixel electrode and the second subpixel electrode is not same. According to the inventive concept, the number of the horizontal stem portions and the vertical stem portions in the first subpixel electrode is less than that in the second subpixel electrode. According to the inventive concept, the number of the subdomain (the number of regions) in the first subpixel electrode is less than that in the second subpixel electrode.

As described above, as the current exemplary embodiment of the present, the exemplary embodiment in which the second subpixel electrode includes four second horizontal stem portions is described, but it is not limited thereto, and the exemplary embodiment in which a plurality of second horizontal stem portions are included in a range where each region included in the second subpixel electrode has a vertical length that does not exceed 100 μm may also be possible.

In addition, the aforementioned display device may be a flat panel display device, but is not limited thereto, and may also be a curved display device.

Particularly, the aforementioned display device may a curved display device that is curved in a direction of its long side.

The exemplary embodiment of the present inventive concept and a comparative example will now be described with reference to FIGS. 7 to 12.

Figure 7:
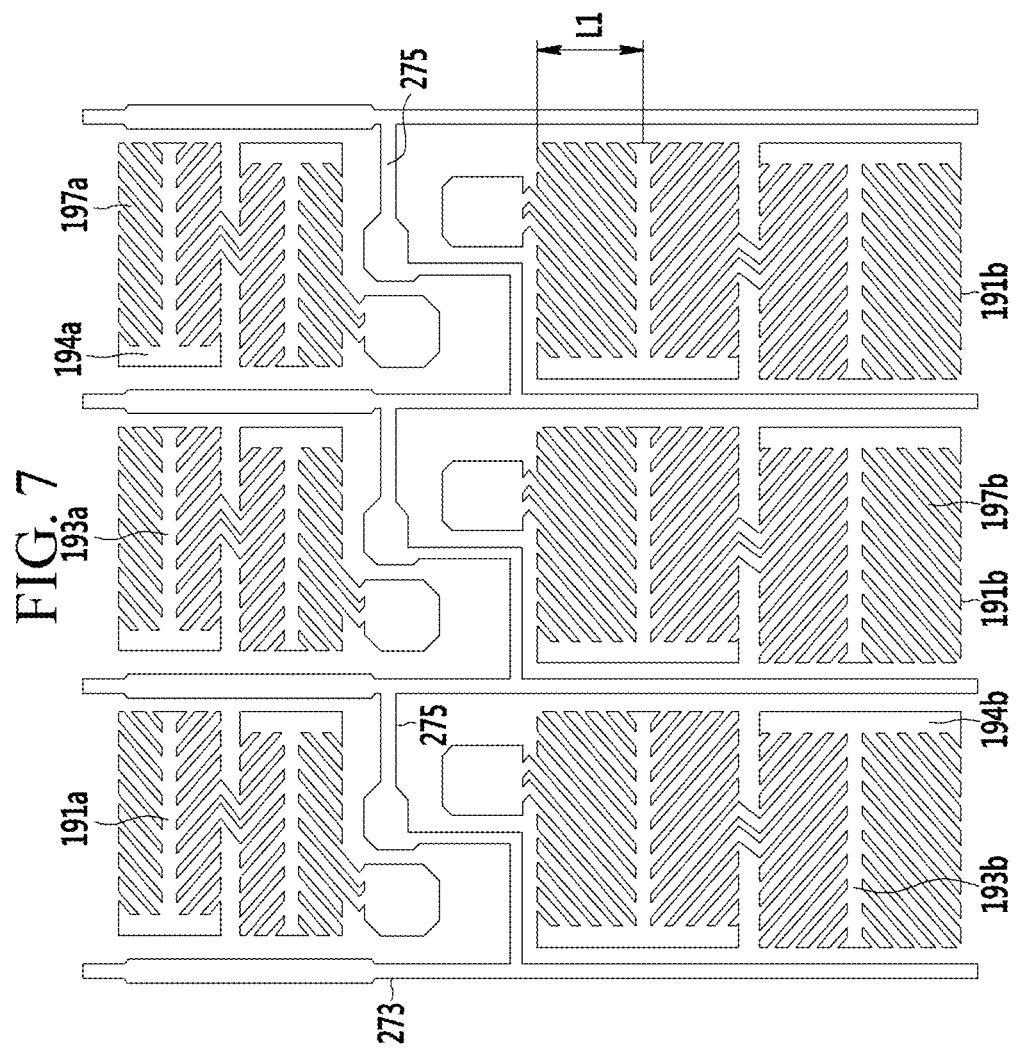
FIG. 7 is a layout view of a plurality of pixels according to the exemplary embodiment of the present inventive concept.
Figure 8:
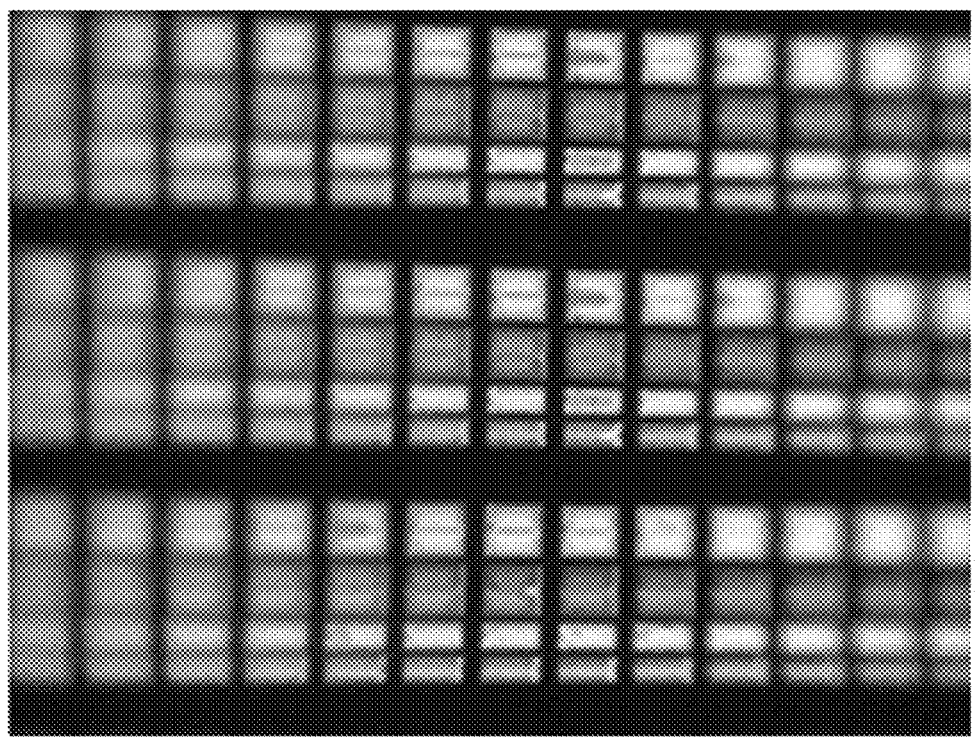
FIG. 8 is a lateral side image of FIG. 7.
Figure 9:
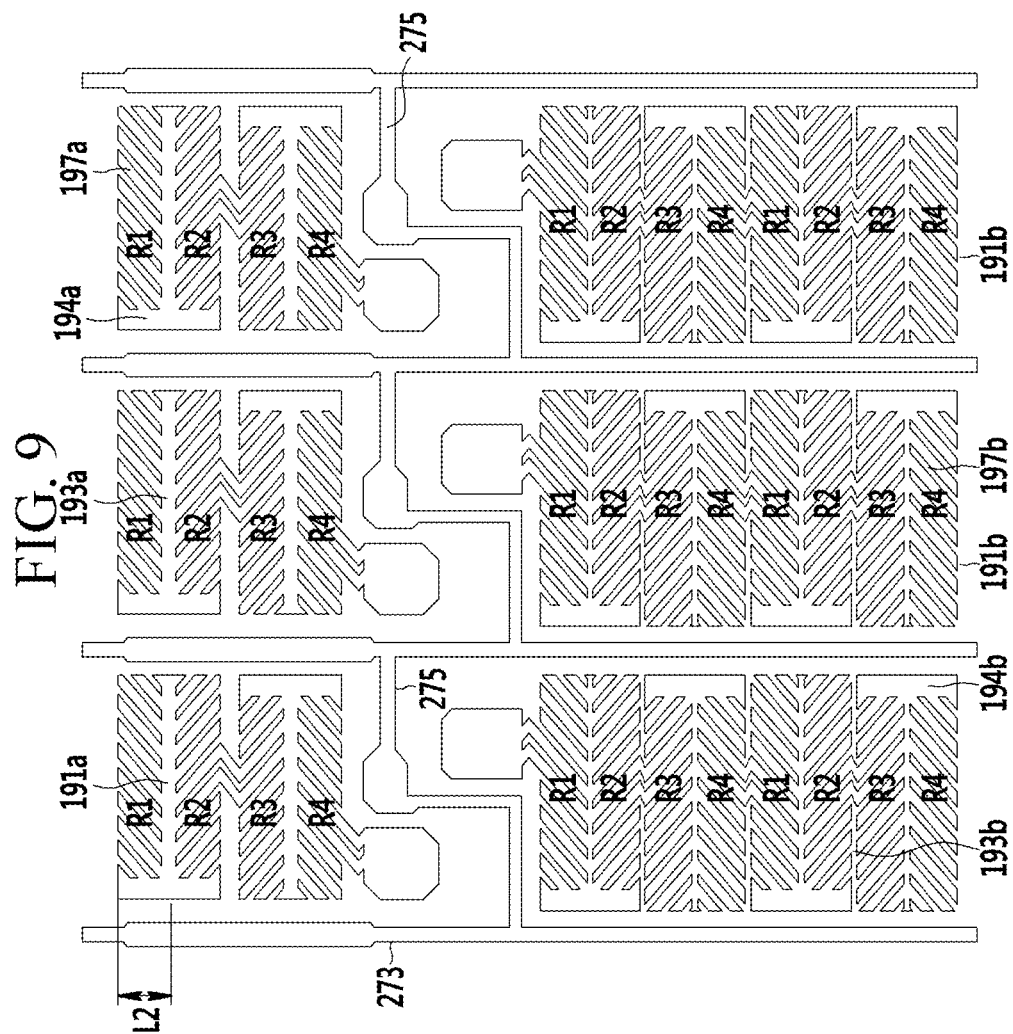
FIG. 9 is a layout view of a plurality of pixels according to another exemplary embodiment of the present inventive concept.
Figure 10:
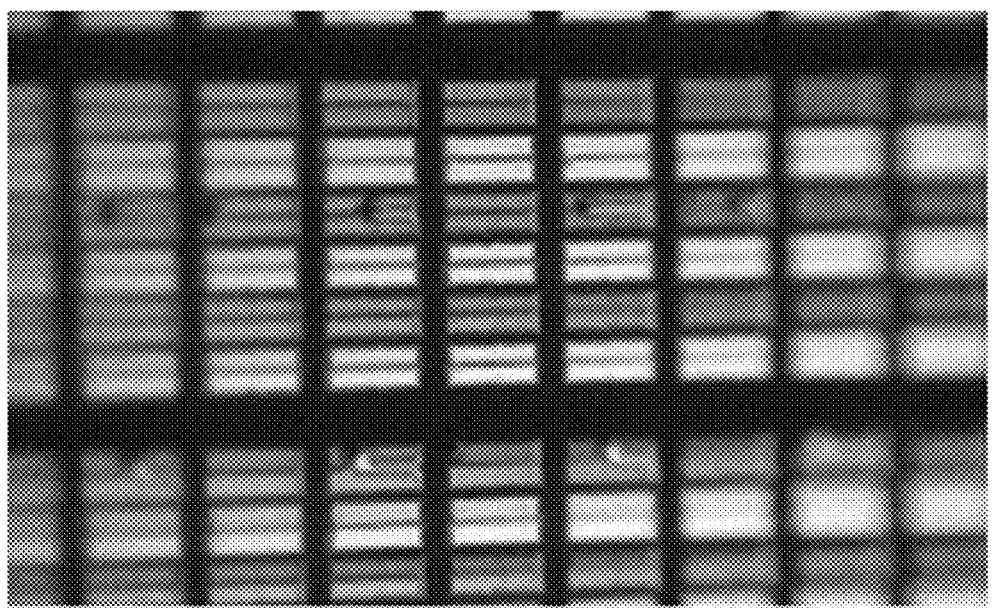
FIG. 10 is a lateral side image of FIG. 9.
Figure 11:
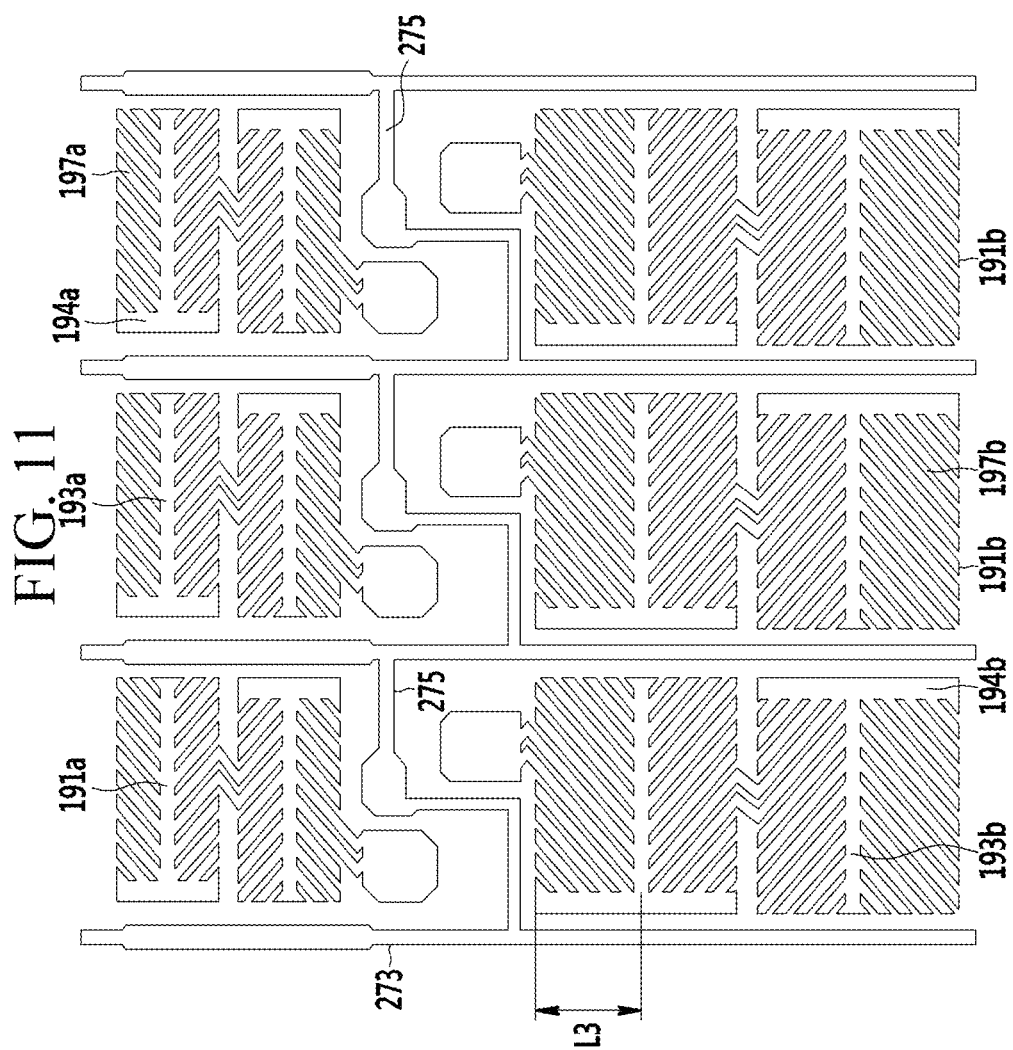
FIG. 11 is a layout view of a plurality of pixels according to a comparative example.
Figure 12:
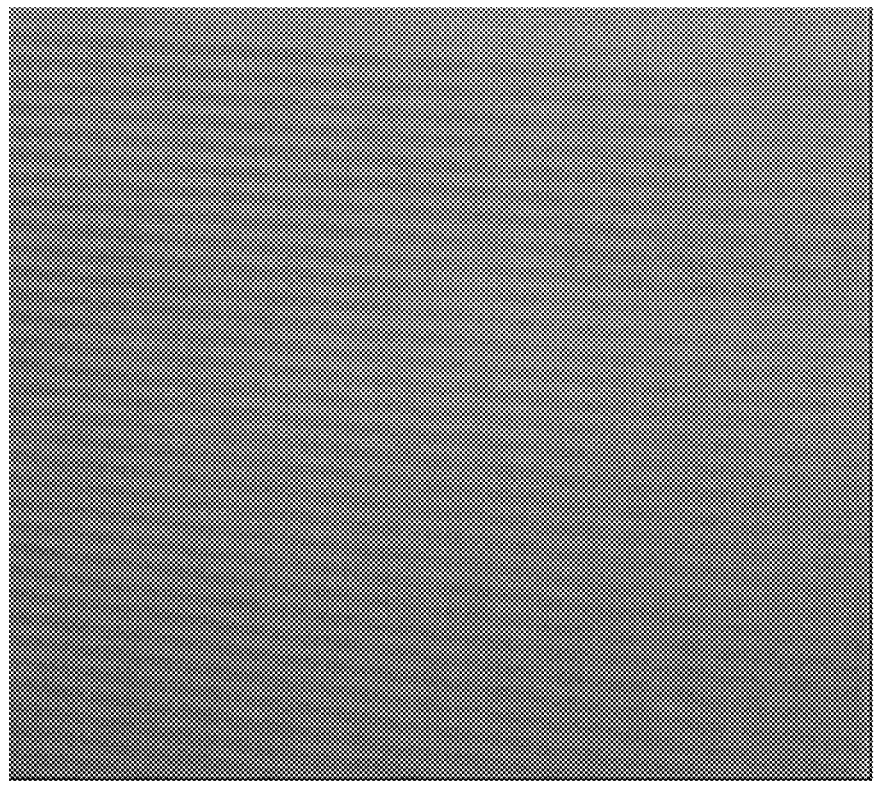
FIG. 12 is an image of a horizontal smudge according to FIG. 11.

FIG. 7 is a layout view of a plurality of pixels according to the exemplary embodiment of the present inventive concept, FIG. 8 is a lateral side image of FIG. 7, FIG. 9 is a layout view of a plurality of pixels according to another exemplary embodiment of the present inventive concept, FIG. 10 is a lateral side image of FIG. 9, FIG. 11 is a layout view of a plurality of pixels according to a comparative example, and FIG. 12 is an image of horizontal smudge according to FIG. 11.

First, FIG. 7 is a top plan view of a plurality of pixel electrodes arranged according to the exemplary embodiment of the present inventive concept.

According to the exemplary embodiment of the present inventive concept, the plurality of pixels having the same shape and configuration are repeatedly arranged.

In this case, a size of each region included in the first subpixel electrode is smaller than that of each region included in the second subpixel electrode, and occurrence of the horizontal smudge in the curved display device is determined by the size of each region included in the second subpixel electrode.

Each region of the second subpixel electrode according to the exemplary embodiment of the present inventive concept has a vertical length of about 100 μm, which is illustrated in FIG. 8, and no horizontal smudge is recognized when it is applied to an approximate 55-inch display device.

In addition, FIG. 9 is a top plan view of a plurality of pixel electrodes being arranged according to another exemplary embodiment of the present inventive concept.

According to the current exemplary embodiment of the present inventive concept, the plurality of pixels having the same shape and configuration are repeatedly arranged. The plurality of pixels are not symmetrically or alternately arranged to each other.

In this case, a size of each region included in the first subpixel electrode is greater than that of each region included in the second subpixel electrode, and occurrence of the horizontal smudge in the curved display device is determined by a vertical length of each region included in the first subpixel electrode. The first subpixel has two first horizontal stem portions and four regions, for example, four domains of R1, R2, R3 and R4. The second subpixel has four horizontal stem portions and eight regions, for example, eight subdomains of R1, R2, R3, R4, R1, R2, R3 and R4. Each region of the first subpixel electrode according to the current exemplary embodiment of the present inventive concept has a vertical length L2 of about 66 μm, which is illustrated in FIG. 10, and no horizontal smudge is recognized even if it is applied to an approximate 105-inch display device.

Such a large display device in which the second subpixel electrode simply including two horizontal stem portions is disposed is illustrated in FIGS. 11 and 12.

Referring to FIG. 11, each region included in the second subpixel electrode has a vertical length L3 of more than 100 μm.

As shown in FIG. 12, each region having such a size is recognized as the horizontal smudge of the display device, thereby deteriorating display quality of the display device.

The results will be described with reference to Table 1 below.

TABLE 1

|  | Size of display device | | | | | |
| --- | --- | --- | --- | --- | --- | --- |
|  | 55" | 65" | 71" | 78" | 105" | |
| Size of each region in first subpixel electrode | 36 | 46 | 55 | 61 | 66 | |
| Size of each region in second subpixel electrode | 71 | 91 | 97 | 116 54 | 126 | 59 |
| Horizontal line index | 4 | 8 | 10 | 14 1 | 30 | 1 |

First, when the display device has a size of 55 to 71 inches, each region of the first subpixel electrode has a vertical length that is smaller than that of each region of the second subpixel electrode.

Thus, a factor for causing the horizontal smudge is the vertical length of each region of the second subpixel electrode.

In this case, since each region of the second subpixel electrode has a vertical length of less than 100 μm, the horizontal line index of about less than 10 is measured and thus no horizontal smudge is recognized.

Next, referring to an approximate 78-inch display device, in a comparative example where the second subpixel electrode includes two horizontal stem portions, each region of the second subpixel electrode has a vertical length of 116 μm and thus a horizontal line is recognized because the length exceeds the 100 μm of the exemplary embodiment of the present inventive concept.

The horizontal line index is also high at about 14.

However, when another exemplary embodiment of the present inventive concept is applied to the display device of the same size where the second subpixel electrode includes four horizontal stem portions, each region of the second subpixel electrode has a vertical length of about 54 μm and the horizontal line index is at about 1.

Similarly, referring to a 105-inch display device, in a comparative example where the second subpixel electrode includes two horizontal stem portions, each region of the second subpixel electrode has a vertical length of about 126 μm and a horizontal line index is about 30, so a considerable amount of vertical smudge is recognized.

However, when another exemplary embodiment of the present inventive concept is applied to the display device of the same size where the second subpixel electrode includes four horizontal stem portions, each region of the second subpixel electrode has a vertical length of about 59 μm and a horizontal line index is about 1, it is observed that no vertical smudge is recognized.

Thus, in the exemplary embodiments according to the present inventive concept, each region included in each subpixel electrode has a vertical length that does not exceed 100 μm, and when a size of the pixel electrode needs to be increased, the subpixel electrodes are additionally divided (i.e., the number of the horizontal stem portions is increased) to control the vertical length be less than 100 μm.

As such, the horizontal smudge or the decreased luminance can be reduced.

Circuit diagrams of the display device according to the exemplary embodiment of the present inventive concept will now be described with reference to FIGS. 13 to 16.

FIGS. 13 to 16 are the circuit diagrams of one pixel according to further exemplary embodiments of the present inventive concept.

The shapes of the gate line and the data line illustrated in FIGS. 2 to 4 may be modified as shown in FIGS. 13 to 16, thereby representing pixel arrangements of FIGS. 13 to 16 having the aforementioned shape of the pixel electrode feasible.

Figure 13:
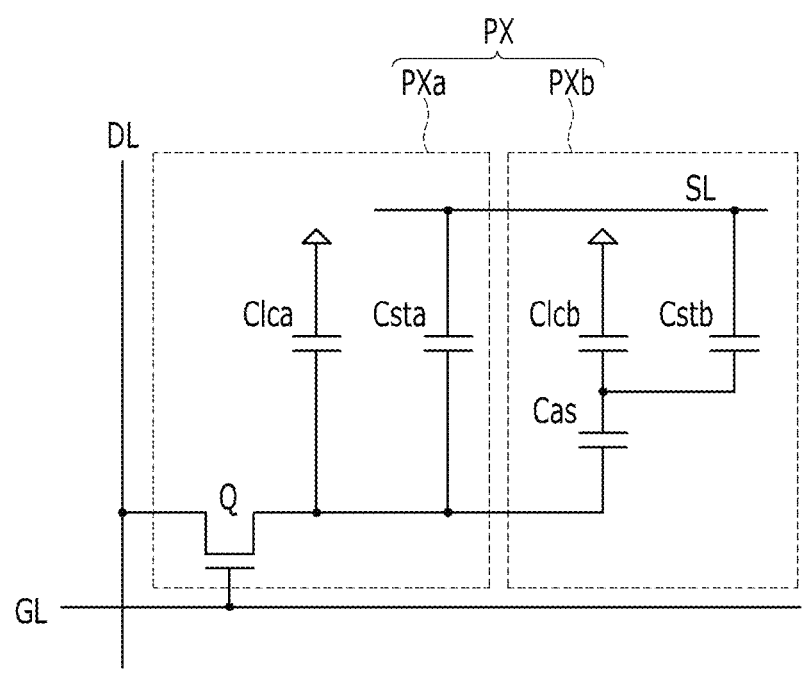
FIGS. 13, 14, 15 and 16 are circuit diagrams of one pixel according to further exemplary embodiments of the present inventive concept.

An exemplary embodiment of FIG. 13 will now be described.

An LCD according to the exemplary embodiment of the present inventive concept includes: signal lines including a plurality of gate lines GL, a plurality of data lines DL, and a plurality of storage electrode lines SL; and a plurality of pixels PXs coupled thereto.

Each pixel PX includes a pair of first and second subpixels PXa and PXb, and a first subpixel electrode is formed in the first subpixel PXa while a second subpixel electrode is formed in the second subpixel PXb.

The LCD according to the exemplary embodiment of the present inventive concept further includes: a switching element Q coupled to the gate line GL and the data line DL; a first storage capacitor Csta and a first liquid crystal capacitor Clca that are coupled to the switching element Q to be formed in the first subpixel PXa; a second liquid crystal capacitor Clcb and a second storage capacitor Cstb that are coupled to the switching element Q to be formed in the second subpixel PXb; and an auxiliary capacitor Cas that is formed between the switching element Q and the second liquid crystal capacitor Clcb.

The switching element Q is a three-terminal element such as a thin film transistor and the like that is provided in a lower panel, a control terminal thereof is coupled to the gate line GL, an input terminal thereof is coupled to the data line DL, and an output terminal thereof is coupled to the first liquid crystal capacitor Clca, the first storage capacitor Csta, and the auxiliary capacitor Cas.

One terminal of the auxiliary capacitor Cas is coupled to the output terminal of the switching element Q, while the other terminal thereof is coupled to the second liquid crystal capacitor Clcb and the second storage capacitor Cstb.

A charged voltage of the second liquid crystal capacitor Clcb is decreased by the auxiliary capacitor Cas such that it is lower than a charged voltage of the first liquid crystal capacitor Clca, thereby improving side visibility of the LCD.

Figure 14:
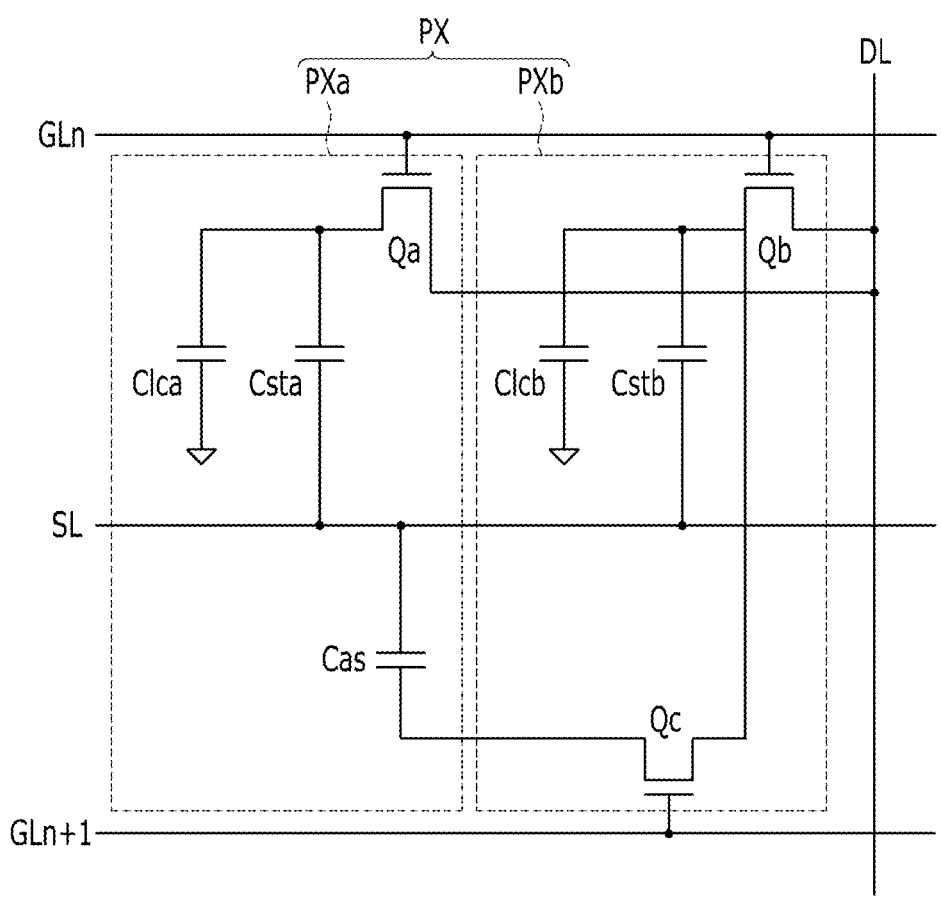

An exemplary embodiment of FIG. 14 will now be described.

An LCD according to the exemplary embodiment of the present inventive concept includes: signal lines including a plurality of gate lines GLn and GL(n+1), a plurality of data lines DL, and a plurality of storage electrode lines SL; and a plurality of pixels PXs coupled thereto.

Each pixel PX includes a pair of first and second subpixels PXa and PXb, a first subpixel electrode is formed in the first subpixel PXa, while a second subpixel electrode is formed in the second subpixel PXb.

The LCD according to the exemplary embodiment of the present inventive concept includes: a first switching element Qa and a second switching element Qb that are coupled to the gate line GLn and the data line DL; a first liquid crystal capacitor Clca and a first storage capacitor Csta that are coupled to the first switching element Qa to be formed in the first subpixel PX; a second liquid crystal capacitor Clcb and a second storage capacitor Cstb that are coupled to the second switching element Qb to be formed in the second subpixel; a third switching element Qc that is coupled to the second switching element Qb to be switched by the next gate line GL(n+1); and an auxiliary capacitor Cas that is coupled to the third switching element Qc.

The first and second switching elements Qa and Qb are three-terminal elements such as a thin film transistor and the like that are provided in a lower panel 100, control terminals thereof are coupled to the gate line GLn, input terminals thereof are coupled to the data line DL, and output terminals thereof are respectively coupled to the first liquid crystal capacitor Clca and the first storage capacitor Csta as well as the second liquid crystal capacitor Clcb and the second storage capacitor Cstb.

The third switching element Qc is also a three-terminal element such as a thin film transistor and the like that is provided in the lower panel, a control terminal thereof is coupled to the next gate line GL(n+1), an input terminal thereof is coupled to the second liquid crystal capacitor Clcb, and an output terminal thereof is coupled to the auxiliary capacitor Cas.

One terminal of the auxiliary capacitor Cas is coupled to the output terminal of the third switching element Qc, while the other terminal thereof is coupled to the storage electrode line SL.

An operation of the LCD according to the exemplary embodiment of the present inventive concept will now be described. When a gate-on voltage is applied to the gate line GLn, the first and second switching elements Qa and Qb connected thereto are turned on, and a data voltage of the data line DL is applied to the first and second subpixel electrodes.

Next, when a gate-off voltage is applied to the gate line GLn and the gate-on voltage is then applied to the next gate line GL(n+1), the first and second switching elements Qa and Qb are turned off and the third switching element Qc is turned on.

Accordingly, charges of the second subpixel electrode coupled to the output terminal of the second switching element Qb flow into the auxiliary capacitor Cas, thereby causing the voltage of the second liquid crystal capacitor Clcb to be decreased.

As such, the charged voltages of the first and second liquid crystal capacitors Clca and Clcb can be differently set to improve side visibility of the liquid crystal display.

Figure 15:
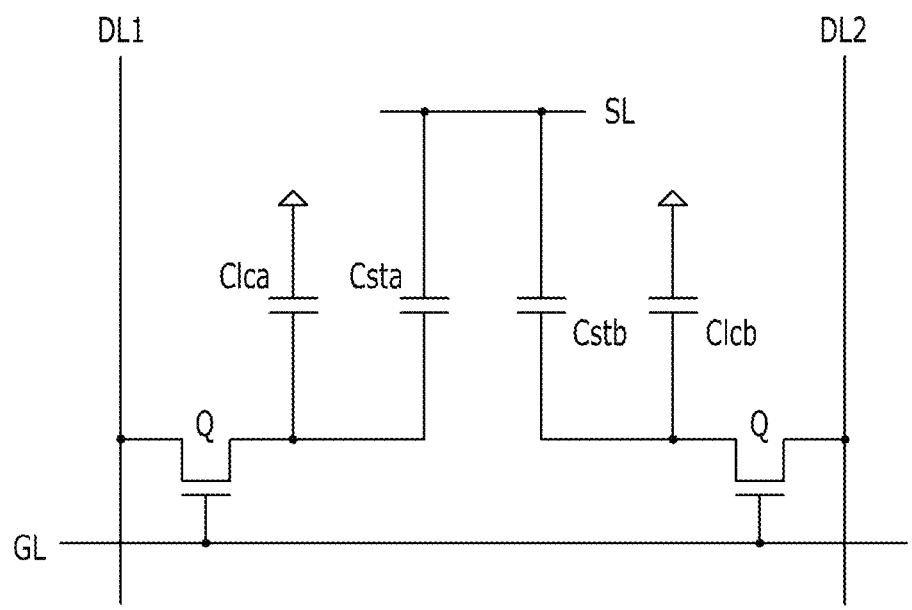

An exemplary embodiment of FIG. 15 will now be described.

An LCD according to the exemplary embodiment of the present inventive concept includes: signal lines including a plurality of gate lines GL, a plurality of data lines DL1 and DL2, and a plurality of storage electrode lines SL; and a plurality of pixels PXs coupled thereto.

Each pixel PX includes a pair of first and second liquid crystal capacitors Clca and Clab, and first and second storage capacitors Csta and Cstb.

Each subpixel includes one liquid crystal capacitor and one storage capacitor, and additionally includes one thin film transistor.

The thin film transistors Q of the two subpixels included in one pixel are coupled to the same gate line GL, but are respectively coupled to the different data lines DL1 and DL2.

Data voltages of different levels are simultaneously applied to the different data lines DL1 and DL2 such that the first and second liquid crystal capacitors Clca and Clcb of the two subpixels have the different charged voltages.

Thus, side visibility of the LCD can be improved.

An exemplary embodiment of FIG. 16 will now be described.

Figure 16:
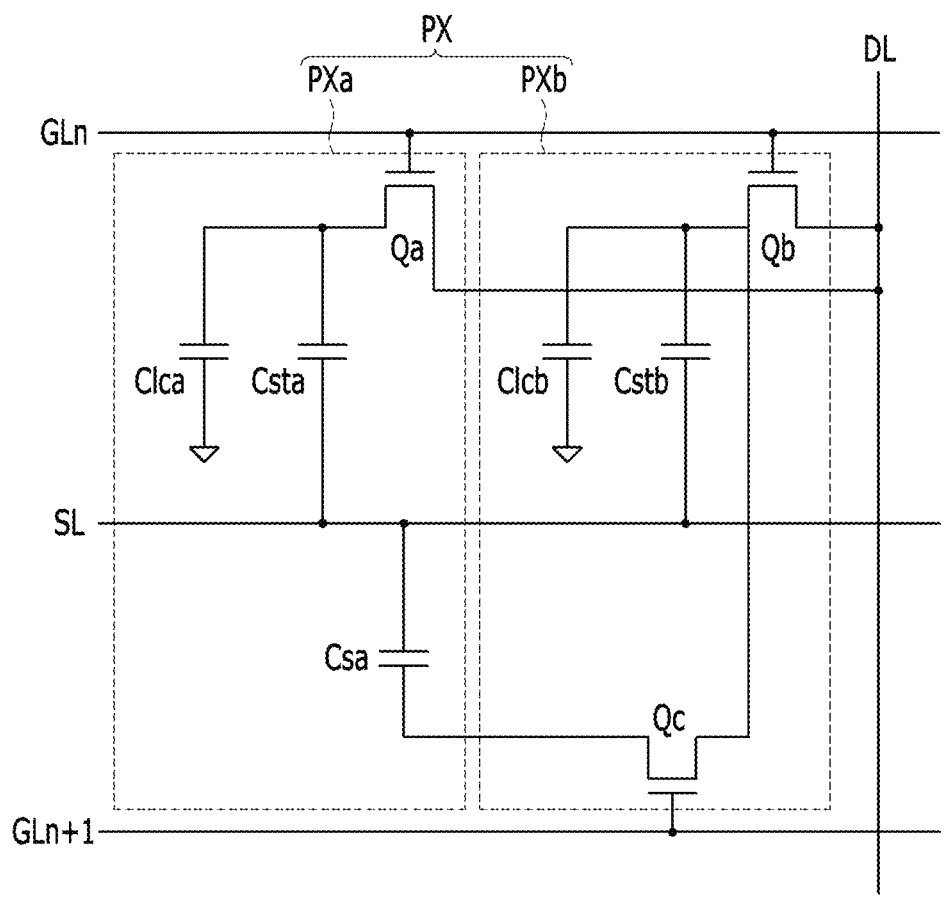

As shown in FIG. 16, an LCD according to the exemplary embodiment of the present inventive concept includes: a gate line GL; a data line DL; a first power line SL1; a second power line SL2; and a first switching element Qa and a second switching element Qb that are coupled to the gate line GL and the data line DL.

The LCD according to the exemplary embodiment of the present inventive concept further includes an auxiliary step-up capacitor Csa and a first liquid crystal capacitor Clca that are coupled to the first switching element Qa, and an auxiliary step-down capacitor Csb and a second liquid crystal capacitor Clcb that are coupled to the second switching element Qb.

The first and second switching elements Qa and Qb are three-terminal elements such as a thin film transistor and the like.

The first and second switching elements Qa and Qb are coupled to the same gate and data lines GL and DL to be turned on at the same time, thereby outputting the same data signal.

The first and second power lines SL1 and SL2 are applied with a voltage that can be swung for a predetermined period.

A first low voltage is applied to the first power line SL1 for the predetermined period (e.g., 1 H), and a first high voltage is applied thereto for the next predetermined period.

A second high voltage is applied to the second power line SL2 for the predetermined period, and a second low voltage is applied thereto for the next predetermined period.

In this case, the first period and the second period are repeated multiple times in one frame such that the voltage that can be swung is applied to the first and second power lines SL1 and SL2.

In this case, the first low voltage and the second low voltage may be identical to each other, and the first high voltage and the second high voltage may also be identical to each other.

The auxiliary step-up capacitor Csa is coupled to the first switching element Qa and the first power line SL1, and the auxiliary step-down capacitor Csb is coupled to the second switching element Qb and the second power line SL2.

A voltage Va of a terminal (hereinafter referred to as a "first terminal") of a part of the auxiliary step-up capacitor Csa coupled to the first switching element Qa is decreased when the first low voltage is applied to the first power line SL1, and is increased when the first high voltage is applied thereto.

Subsequently, as the voltage of the first power line SL1 is swung, the voltage Va of the first terminal is also swung.

In addition, a voltage Vb of a terminal (hereinafter referred to as a "second terminal") of a part of the auxiliary step-down capacitor Csb coupled to the second switching element Qb is increased when the second high voltage is applied to the second power line SL2, and is decreased when the second low voltage is applied thereto.

Subsequently, as the voltage of the second power line SL2 is swung, the voltage Vb of the second terminal is also swung.

As such, even if the same data voltage is applied to the two subpixels, the voltages Va and Vb of the pixel electrodes of the two subpixels are changed depending on the swung voltages of the first and second power lines SL1 and SL2, thereby improving side visibility as well as making transmittances of the two subpixels different.

In the exemplary embodiments of FIGS. 13 to 16, a reference voltage line is not used, but any line parallel to the data line is formed to traverse a center of a display area of a pixel, thereby improving display quality.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device comprising:
a first insulation substrate;
a thin film transistor disposed on the first insulation substrate and connected to a gate line and a data line;
a pixel electrode coupled to the thin film transistor, the pixel electrode receiving a same data voltage from the data line;
a second insulation substrate facing the first insulation substrate; and
a common electrode disposed on the second insulation substrate,
wherein the pixel electrode in a pixel includes a first subpixel electrode including two first horizontal stem portions and two first vertical stem portions perpendicular to the two first horizontal stem portions, one end of the two first horizontal stem portions being connected to a center of the two first vertical stem portions, respectively, one of the two first vertical stem portions is disposed on the left side in the pixel and the other is disposed on the right side in the pixel, and the two first vertical stem portions extend along an extension direction of the data line and do not overlap in an extending direction of the gate line, and a second subpixel electrode including a second vertical stem portion and a second horizontal stem portion perpendicular to the second vertical stem portion, one end of the second horizontal stem portion being connected to a center of the second vertical stem portion, the second subpixel electrode including a plurality of regions which are defined by the second vertical stem portion and the second horizontal stem portion,
each of the plurality of regions has a longest vertical length of less than about 100 μm, and the plurality of regions do not overlap in an extending direction of the gate line and are disposed along an extending direction of the data line, and
the first subpixel electrode and the second subpixel electrode are not directly connected.

2. The display device of claim 1, wherein the display device is a curved type.

3. The display device of claim 2, wherein the first subpixel electrode includes first minute branch portions that extend from the two first horizontal stem portions and the two first vertical stem portions, and the second subpixel electrode includes second minute branch portions that extend from the second horizontal stem portion and the second vertical stem portion.

4. The display device of claim 2, wherein the first subpixel electrode includes four regions in which the arrangements of the liquid crystal molecules are respectively different along a row direction, the four regions being disposed along a column direction.

5. The display device of claim 2, wherein the second subpixel electrode includes a plurality of second vertical stem portions and the plurality of second vertical stem portions are alternately disposed.

6. The display device of claim 5, wherein the second subpixel electrode includes four regions in which the arrangements of the liquid crystal molecules are respectively different along a row direction, the four regions being disposed along a column direction.

7. The display device of claim 2, wherein the display device has pixel electrodes that are arranged in a matrix form.

8. The display device of claim 2, wherein a size of each region included in the first subpixel electrode is greater than that of each region included in the second subpixel electrode.

9. The display device of claim 8, wherein each region included in the second subpixel electrode has a vertical length of less than about 100 μm.

10. The display device of claim 2, wherein the second subpixel electrode includes a plurality of second horizontal stem portions, and
wherein the number of the plurality of second horizontal stem portions is greater than two, and each region included in the first subpixel electrode has a vertical length of less than about 100 μm.

11. The display device of claim 1, wherein the first subpixel electrode further includes first minute branch portions that extend from the two first horizontal stem portions and the two first vertical stem portions, and the second subpixel electrode further includes second minute branch portions that extend from the second horizontal stem portion and the second vertical stem portion.

12. The display device of claim 11, wherein the second subpixel electrode includes a plurality of second vertical stem portions and the plurality of second vertical stem portions are alternately disposed.

13. The display device of claim 12, wherein the second subpixel electrode includes four regions in which the arrangements of the liquid crystal molecules are respectively different along a row direction, the four regions being disposed along a column.

14. The display device of claim 1, wherein the first subpixel electrode includes four regions in which the arrangements of the liquid crystal molecules are respectively different along a row direction, the four regions being disposed along a column.

15. The display device of claim 1, wherein the display device has pixel electrodes that are arranged in a matrix form.

16. The display device of claim 1, wherein a size of each region included in the first subpixel electrode is smaller than that of each region included in the second subpixel electrode.

17. The display device of claim 16, wherein each region included in the second subpixel electrode has a vertical length of less than about 100 μm.

18. The display device of claim 1, wherein the second subpixel electrode includes a plurality of second horizontal stem portions, and
wherein the number of the plurality of second horizontal stem portions is greater than two, and each region included in the first subpixel electrode has a vertical length of less than about 100 μm.

* * * * *